US009685840B2

(12) United States Patent
Germann et al.

(10) Patent No.: US 9,685,840 B2
(45) Date of Patent: Jun. 20, 2017

(54) MOTOR

(71) Applicant: Fisher & Paykel Appliances Limited, Manukau (NZ)

(72) Inventors: Timothy Scott Germann, Auckland (NZ); Gerald David Duncan, Auckland (NZ); Gregory Paul Hill, Auckland (NZ)

(73) Assignee: Fisher & Paykel Appliances Limited, Manukau (NZ)

( * ) Notice: Subject to any disclaimer, the term of this patent is extended or adjusted under 35 U.S.C. 154(b) by 387 days.

(21) Appl. No.: 14/135,299

(22) Filed: Dec. 19, 2013

(65) Prior Publication Data
US 2014/0175912 A1 Jun. 26, 2014

Related U.S. Application Data

(60) Provisional application No. 61/740,738, filed on Dec. 21, 2012.

(51) Int. Cl.
*H02K 5/16* (2006.01)
*H02K 7/08* (2006.01)
(Continued)

(52) U.S. Cl.
CPC ............. *H02K 7/085* (2013.01); *F04D 17/04* (2013.01); *F04D 25/062* (2013.01);
(Continued)

(58) Field of Classification Search
CPC ......... H02K 7/085; H02K 1/30; H02K 1/2786
(Continued)

(56) References Cited

U.S. PATENT DOCUMENTS 3,474,272 A 10/1969 Newell
6,333,576 B1 12/2001 Ishikawa et al.
(Continued)

FOREIGN PATENT DOCUMENTS

CN 1281284 A 1/2001
CN 1393979 A 1/2003
(Continued)

OTHER PUBLICATIONS

Extended European Search Report dated Jul. 13, 2016, for Application No. 13864222.8/2936659 PCT/NZ2013000242; 9 Pages.

*Primary Examiner* — Hanh Nguyen
(74) *Attorney, Agent, or Firm* — Knobbe Martens Olson & Bear LLP

(57) ABSTRACT

A BLDC motor for driving a cross flow fan in an air-conditioning application has an external rotor and an internal stator. The stator is a salient pole stator with insulated pole teeth and conductor coils. The inner diameter of the stator supports a single bearing. An electronic PCBA for control of the BLDC motor is optionally attached to the stator, all of which is encapsulated in a thermoset resin. The rotor comprises permanent magnet component(s) and a rotor frame. The rotor frame includes a stub axle that engages with the bearing element and features to provide torsional or rotational compliance between the rotor magnets and the fan. A level of compliance is provided between the bearing element and the stator to allow for angular misalignment between the rotational axis of the fan and the stator.

7 Claims, 13 Drawing Sheets

(51) Int. Cl.
  *H02K 1/27* (2006.01)
  *H02K 1/30* (2006.01)
  *H02K 3/52* (2006.01)
  *F04D 25/06* (2006.01)
  *F04D 17/04* (2006.01)
  *H02K 1/18* (2006.01)
  *H02K 5/167* (2006.01)
  *H02K 5/173* (2006.01)
  *H02K 21/22* (2006.01)
  *H02K 7/14* (2006.01)

(52) U.S. Cl.
  CPC ....... *F04D 25/064* (2013.01); *F04D 25/0646* (2013.01); *H02K 1/187* (2013.01); *H02K 1/2786* (2013.01); *H02K 1/30* (2013.01); *H02K 3/522* (2013.01); *H02K 5/1675* (2013.01); *H02K 5/1735* (2013.01); *H02K 7/14* (2013.01); *H02K 21/22* (2013.01); *H02K 2203/12* (2013.01)

(58) Field of Classification Search
  USPC ...................................................... 310/43, 90
  See application file for complete search history.

(56) References Cited

U.S. PATENT DOCUMENTS

| | | | |
|---|---|---|---|
| 6,362,554 | B1 | 3/2002 | Neal |
| 8,415,841 | B2* | 4/2013 | Jang ............. F04D 29/056 310/43 |
| 8,573,954 | B2* | 11/2013 | Yoo ............. F04D 25/0613 417/354 |
| 8,922,076 | B2* | 12/2014 | Hsieh ............. H02K 5/128 310/43 |
| 9,033,680 | B2* | 5/2015 | Kudo ............. F04D 17/16 417/354 |
| 2005/0106015 | A1 | 5/2005 | Osgood |
| 2006/0082242 | A1 | 4/2006 | Schill |
| 2009/0115276 | A1 | 5/2009 | Kodama |
| 2010/0314954 | A1 | 12/2010 | Araki et al. |
| 2012/0326542 | A1* | 12/2012 | Rojo Lulic ......... H02K 1/2786 310/90 |

FOREIGN PATENT DOCUMENTS

| | | |
|---|---|---|
| CN | 1988334 | 6/2007 |
| CN | 101350540 | 1/2009 |
| CN | 201307790 | 9/2009 |
| CN | 201466819 | 5/2010 |
| DE | 10 2011 008134 A1 | 7/2011 |
| JP | 62104452 | 5/1987 |
| JP | 1129743 | 5/1989 |
| JP | 1159497 | 6/1989 |
| JP | 1290999 | 11/1989 |
| JP | 2045697 | 2/1990 |
| JP | 2197236 | 8/1990 |
| JP | 2207192 | 8/1990 |
| JP | 3007045 | 1/1991 |
| JP | 3011965 | 1/1991 |
| JP | 03480443 | 12/2003 |
| JP | 3513654 | 3/2004 |
| JP | 2005069580 | 3/2005 |
| JP | 03903971 | 4/2007 |
| JP | 3966258 | 8/2007 |
| JP | 03966258 | 8/2007 |
| JP | 2008-88831 | 4/2008 |
| JP | 04075707 | 4/2008 |
| JP | 200899520 | 4/2008 |
| JP | 2008086184 | 4/2008 |
| JP | 2008088831 A | 4/2008 |
| JP | 2008261598 | 10/2008 |
| JP | 2009287900 | 12/2009 |
| JP | 04487998 | 6/2010 |
| JP | 04552381 | 9/2010 |
| JP | 04618292 | 1/2011 |
| JP | 04816380 | 11/2011 |
| JP | 04946320 | 6/2012 |
| JP | 04952173 | 6/2012 |
| JP | 04952174 | 6/2012 |
| WO | WO02/44568 | 6/2002 |
| WO | WO2005/019738 | 3/2005 |
| WO | WO 2011/032201 A1 | 3/2011 |
| WO | WO2010/058666 | 5/2011 |

* cited by examiner

MOTOR

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present invention generally relates to a motor, and more specifically relates to a motor for an air-conditioning unit and an air-conditioning unit comprising a motor.

Description of the Related Art

Many applications use brushless direct current (BLDC) motors. A known motor construction is an internal stator with radially outwardly extending electrically commutated poles, and an external rotor with permanent magnet poles arranged circumferentially and facing outer ends of the stator poles. Such a motor configuration may be described as an inside-out BLDC motor.

Inside-out BLDC motors have been used in air-conditioning units. The motor is used to drive a fan or blower of the air-conditioning unit. The fan or blower typically has an axial length that is many times the axial length of the motor. One end of the fan is coupled to the motor and an opposite end is supported by a bearing arrangement.

Due to the length of the fan, alignment of the fan, the rotor and the stator on a common rotational axis may be difficult. A circumferential air gap must be maintained between the stator poles and the rotor poles.

Vibration generated in the motor preferably is substantially isolated from the fan and motor mounting supports for quiet operation of the fan and the related air-conditioning unit.

The fan or blower of a modern air-conditioning unit typically has a diameter of about 100 mm. The motor preferably is of a compact size commensurate with the diameter of the fan and the motor preferably has a compact axial length. To achieve a compact size and to improve manufacturability, the motor and the connection of the motor to the fan assembly, preferably comprises few components.

In this specification, where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the present invention to provide an improved motor, or an improved motor for an air-conditioning unit, or an improved air-conditioning unit, or to at least provide the industry or public with a useful choice.

SUMMARY OF THE INVENTION

In one aspect, the present invention consists in a motor comprising:

a stator comprising an annular core, stator poles extending from the annular core, and phase windings wound on the stator poles; and a rotor comprising:

rotor poles facing ends of the stator poles, a rotor axle extending axially from the rotor to an inside of the annular core, and a bearing element mounted inside the annular core, the bearing element being positioned between the rotor axle and the stator to rotationally couple the rotor to the stator;

at least one of (a) the bearing element comprising a spherical bearing and (b) a compliant mount being positioned between the rotor and the stator;

the stator further comprising:

a bearing locating member that mounts the bearing element radially inside the annular core, and an insulator covering surfaces of the stator poles, the windings wound onto the stator poles over the insulator, and the bearing locating member being integrally formed with the insulator.

In some embodiments the motor comprises the compliant mount and the compliant mount is an elastomeric sleeve or rubber sleeve providing a resilient mount for the bearing element, positioned between the bearing element and the bearing locating member or between the bearing element and the rotor axle.

In some embodiments the bearing element is axially located at or near to a magnetic centre plane of the motor.

In some embodiments the distance between an axial centre of the bearing element and the magnetic centre plane of the motor is less than about 20% of the axial length of the annular core.

In some embodiments the compliant mount is a ball joint comprising a ball component received in a socket.

In some embodiments the bearing locating member comprises a radially inward facing surface or surfaces and an axial facing surface for mounting the bearing element radially and axially.

In some embodiments the motor comprises an encapsulant encapsulating the annular core, the phase windings, and the bearing locating member, the encapsulant rigidly supporting the bearing locating member.

In some embodiments the motor includes only one bearing element that contacts the rotor axle.

In another aspect, the present invention consists in a motor comprising:

a stator comprising an annular core with stator poles and phase windings wound on the stator poles;

a rotor comprising rotor poles facing the ends of the stator;

wherein said stator comprises an annular mounting portion and an annular resilient isolating member in contact with the mounting portion for resiliently mounting the stator to a support structure and for providing an air seal between the stator and the support structure.

In some embodiments the annular mounting portion is an annular groove around a circumference of the stator and the annular resilient isolating member is received in the groove and has a U-shaped cross-section providing a radially outwardly facing annular channel.

In some embodiments the annular mounting portion is an annular rim or projection around a circumference of the stator, and the annular resilient isolating member has a U-shaped cross-section providing a radially inwardly facing annular channel, the annular rim or projection received in the radially inwardly facing annular channel.

In some embodiments the annular resilient isolating member comprises a first annular surface and a second substantially oppositely facing annular surface axially spaced from the first annular surface, the first and second annular surfaces each comprising a plurality of projections spaced apart circumferentially around the first and second annular surfaces.

In some embodiments the first and second annular surfaces are on the inside of the U-shaped cross-section.

In some embodiments the projections are radial ribs.

In some embodiments the radial ribs form an annular saw-tooth pattern.

In some embodiments the annular resilient isolating member comprises a first annular surface and a second, substantially oppositely facing annular surface axially spaced from the first annular surface, and the first and second annular surfaces each arranged opposingly at an angle to a transverse plane of the stator to position the stator axially and radially with respect to the support structure.

In some embodiments the stator comprises an encapsulant encapsulating the annular core and the phase windings, and the annular mounting portion is formed by the encapsulant.

In another aspect, the present invention consists in a motor comprising:

a stator comprising an annular core with stator poles;
a rotor comprising:
rotor poles facing the ends of the stator poles, and
a rotor axle extending axially from the rotor to the inside of the annular core;
a bearing element mounted radially inside the annular core between the rotor axle and the stator to rotationally couple the rotor to the stator, wherein
the rotor comprises a rotor frame for supporting the rotor poles, and
the rotor frame and rotor axle are integrally formed from a moulded plastics material.

In some embodiments the rotor frame comprises an axial member between the rotor frame and the rotor axle, the rotor frame, axial member and rotor axle integrally formed from the moulded plastics material, the outside diameter of the axial member increasing with axial distance from the rotor axle.

In some embodiments the axial member is a hollow frusto-conical-shaped member.

In some embodiments the rotor comprises a ring of magnetisable material being magnetised to provide a series of magnet poles of alternating polarity forming the rotor poles.

In some embodiments the ring of magnetisable material is magnetised to provide a series of inwardly facing magnet poles of alternating polarity at the inside surface of the ring forming the rotor poles, and to have magnetic flux paths from each magnet pole in the ring passing to an adjacent magnet pole in the ring, such that a majority of the magnetic flux path does not exit the outside surface of the ring.

In some embodiments the rotor does not include any magnetically permeable backing ring outside the ring of magnetisable material.

In some embodiments the ring of magnetisable material is formed in a single piece.

In another aspect, the present invention consists in a motor rotor comprising:

rotor poles,
a central hub at a rotational axis of the rotor, and
a rotor frame for supporting the rotor poles,
the rotor frame having levels of axial, radial and rotational compliance wherein the level of rotational compliance is much greater than the levels of both axial and radial compliance.

In some embodiments the rotor frame comprises an axially and radially stiff and rotationally compliant connection between the rotor poles and the central hub of the rotor.

In some embodiments the rotor frame comprises a plurality of spokes that extend between the central hub and the rotor poles, at least one spoke extending outwardly with respect to the rotational axis of the rotor, the plurality of spokes providing the axially and radially stiff and rotationally compliant connection between the rotor poles and the central hub of the rotor.

In some embodiments the stiffness of at least one spoke is greater in an axial direction than in a circumferential direction.

In some embodiments at least one spoke comprises a segment having cross-section having an axial depth greater than a circumferential thickness, which extends along the spoke for a distance which is greater than the axial depth.

In some embodiments an axial depth of at least one spoke decreases along at least a portion of a length of the at least one spoke.

In some embodiments an axial depth of at least one spoke towards a hub end of the at least one spoke is at least three times a circumferential thickness of the at least one spoke.

In some embodiments an axial depth of at least one spoke towards an outer end of the at least one spoke is at least twice a circumferential thickness of the at least one spoke.

In some embodiments a length of at least one spoke is at least four times an axial depth of the at least one spoke at a hub end of the at least one spoke.

In some embodiments the rotor frame comprises:

an end wall or an end frame, the central hub being formed at a centre of the end wall or the end frame, and
a plurality of spokes extending in an axial direction between the end wall or the end frame and the rotor poles, the plurality of spokes providing an axially and radially stiff and rotationally compliant connection between the rotor poles and the central hub of the rotor.

In some embodiments a stiffness of at least one spoke is greater in a radial direction than in a circumferential direction.

In some embodiments at least one spoke has a segment having a cross-section, the cross-section having a depth greater than a circumferential thickness, which extends along the at least one spoke for an axial distance greater than the depth.

In some embodiments a depth of at least one spoke is at least twice a circumferential thickness of the at least one spoke.

In some embodiments the length of the at least one spoke is at least twice the depth of the at least one spoke.

In some embodiments the rotor comprises a stop member, the stop member being arranged and configured to limit relative rotational movement between the rotor poles and the central hub of the rotor.

In some embodiments the stop member is a cantilever located between two adjacent spokes, the cantilever extending inwardly from an outer end of the two adjacent spokes.

In some embodiments the plurality of spokes is an odd number or a prime number.

In some embodiments the rotor frame comprises at least seven spokes.

In some embodiments the rotor frame comprises nine spokes.

In some embodiments an alternative material to a material used to construct the rotor frame is over-moulded or co-moulded to at least one of the spokes to achieve a desired balance between axial and radial stiffness and rotational compliance of the at least one spoke.

In some embodiments a strengthening member is embedded in at least one spoke to achieve a desired balance between axial and radial stiffness and rotational compliance of the at least one spoke.

In another aspect, the present invention consists in a motor comprising the rotor as described above and a stator having an annular core with stator poles, the rotor poles facing the ends of the stator poles, wherein the motor is an internal stator external rotor BLDC motor, the annular core comprising radial outwardly extending stator poles, the rotor comprising permanent magnet rotor poles arranged circumferentially outside the stator and facing the ends of the stator poles.

In another aspect, the present invention consists in an air-conditioning unit comprising a fan and a motor as described above for driving the fan, wherein the fan is coupled to the central hub of the rotor.

In some embodiments the fan comprises a rotational stop for limiting relative rotational movement between the rotor poles and the central hub of the rotor.

In another aspect, the present invention consists in a motor rotor comprising:

a ring of magnetisable material; and a plastic frame connected with the ring of magnetisable material and having a mounting portion connected with, or for connecting with, a fan or impeller;

the ring of magnetisable material being magnetised to provide a series of inwardly facing magnet poles of alternating polarity at the inside surface of the ring, and to have magnetic flux paths from each magnet pole in the ring passing to an adjacent magnet pole in the ring, such that a majority of the magnetic flux path does not exit the outside surface of the ring.

In some embodiments the rotor does not include any magnetically permeable backing ring outside the ring of magnetisable material.

In some embodiments the ring is formed in a single piece.

In some embodiments the ring is formed of a moulded composition including plastics and permanent magnet material.

In some embodiments the permanent magnet material comprises ferrite.

In some embodiments the ring is between about 4 mm and about 15 mm thick radially, between about 5 mm and about 25 mm thick axially, and has an inside diameter of between about 50 mm and about 100 mm.

In some embodiments the rotor includes at least six inwardly facing magnet poles.

In another aspect, the present invention consists in a motor comprising the rotor as described above and a stator having an annular core with stator poles, the rotor poles facing the ends of the stator poles, wherein the motor is an internal stator external rotor BLDC motor, the annular core comprising radial outwardly extending stator poles, the rotor poles arranged circumferentially outside the stator and facing the ends of the stator poles.

As used herein the term "and/or" means "and" or "or", or both.

As used herein "(s)" following a noun means the plural and/or singular forms of the noun.

The term 'radial' or the phrase 'radial length' or 'radial depth' as used in this specification and claims is not intended to be limited to mean a length or depth dimension of an element or part or an element or part that is oriented purely radially with respect to a centre. The term 'radial' or the phrase 'radial length' or 'radial depth' is also intended to describe a dimension of an element or part or an element or part that is oriented in a direction between a radial direction and a tangential direction with respect to a centre. For example, a component that extends outwardly relative to a centre at an angle to a radial line extending from the centre or is curved relative to a radial line extending from the centre is also to be interpreted as extending radially.

The phrase "air-conditioning unit" may refer to any equipment that forms part of an air-conditioning system, for example a blower unit to be used to blow conditioned air into a room or space being conditioned.

The term "comprising" means "consisting at least in part of". When interpreting each statement in this specification and claims that includes the term "comprising", features other than that or those prefaced by the term may also be present. Related terms such as "comprise" and "comprises" are to be interpreted in the same manner.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention consists in the foregoing and also envisages constructions of which the following gives examples only.

BRIEF DESCRIPTION OF THE DRAWINGS

Preferred embodiments of the invention will be described by way of example only and with reference to the following drawings.

DETAILED DESCRIPTION OF THE PREFERRED EMBODIMENT

A motor that is arranged and configured in accordance with certain features, aspects and advantages of an embodiment of the present invention is described with reference to FIGS. 1 to 3. A preferred use for the illustrated motor is for driving a fan in an air-conditioning unit. Accordingly, certain features, aspects and advantages of the present invention relate to configuring the motor for such a preferred use.

The following embodiments are generally described with reference to use of the motor for driving the fan of an air-conditioning unit. However, the motor may be used in other applications. Further, certain features, aspects and advantages of the present invention or inventions are described generally with reference to an internal stator with radially extending poles and an external rotor motor configuration. However, certain features, aspects and advantages of the present invention or inventions may be applied to other motor configurations. For example but without limitation, certain features, aspects and advantages of the present invention or inventions may be incorporated into an axial motor comprising axially facing stator and rotor poles, a claw pole motor, or a switched reluctance motor.

Figure 1:
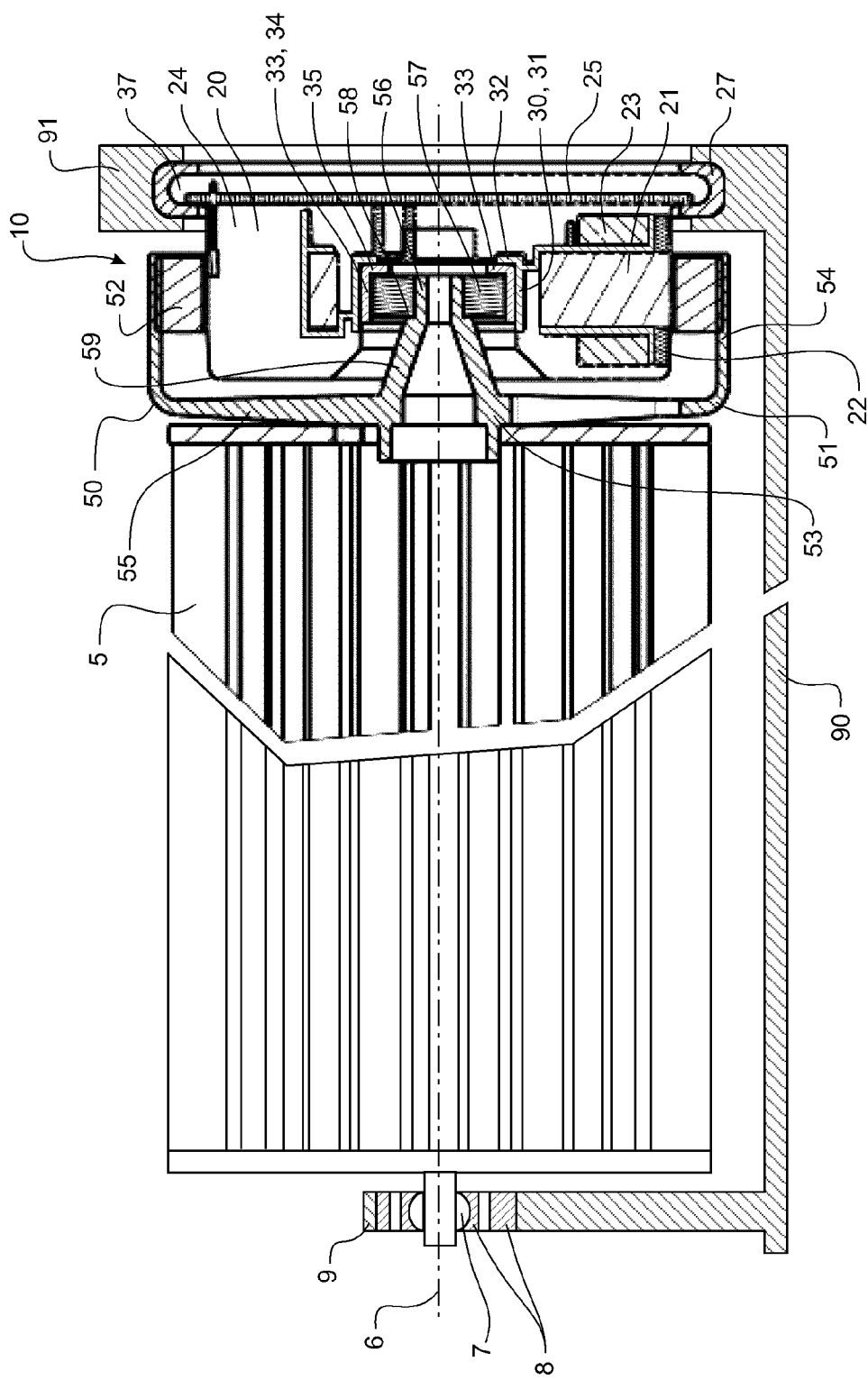
FIG. 1 is a cross-sectional view of a motor and a cross flow fan (partly shown) coupled to a rotor of the motor arranged and configured in accordance with certain features, aspects and advantages of an embodiment of the present invention.

With reference to FIG. 1, the illustrated motor 10 comprises an internal stator 20 and an external rotor 50. The stator 20 is shown in an exploded view in FIG. 3 and comprises a magnetically permeable core 21 comprising an annular ring portion and a plurality of poles extending radially outward from the outside of the annular ring portion. The core 21 may be helically wound from a strip element comprising a longitudinal base with teeth extending generally perpendicular to the longitudinal base. The strip can be wound in a coil to form a multi-layered core. In some configurations, the core 21 may be assembled by stacking separate layers, each layer formed as a single part or comprising multiple segments. Each layer or layer segment may be stamped from a parent sheet material or wound from a strip element. In some configurations, the core 21 may be sintered or formed from a mouldable soft magnetic composite. In some configurations, the core 21 may for formed from, for example, a soft magnetic composite comprising iron powder particles separated with an electrically insulating layer.

An insulator structure 22 can surround at least a portion of the core 21 or, in some configurations, most of the core 21. Conductive windings 23 (illustrated schematically) can be arranged on the poles. In some configurations, the insulator structure 22 is over-moulded to the core 21. In some configurations, the insulator structure 22 is separately moulded and subsequently assembled to the core 21. For example, the insulator structure 22 may be formed as a separately moulded part, or may be separately moulded in two or more parts that are each assembled to the core to form the insulator. One suitable plastic material for moulding or over-moulding the insulator structure 22 is PBT (Polybutylene Teraphthalate). In some configurations, the stator core 21 may be insulated by an epoxy coating, for example but without limitation. In some configurations, the stator components (e.g., the core 21, the insulator structure 22 and the windings 23) are encapsulated by a bulk moulding compound 24. The compound 24 can comprise, for example but without limitation, a thermoset resin.

A printed circuit board ("PCB") 25, which can include control circuitry and electronic components for electrical commutation of the stator windings 23, is included with the stator assembly 20 by encapsulation with the bulk moulding compound 24 together with other stator components. The PCB 25 may also comprise sensors that can be used for motor control. In some configurations, the sensors can include hall-effect sensors 26 that are used to sense rotor position, for example but without limitation. For simplicity, FIG. 3 illustrates the PCB 25 without electronic components and electric connections to the stator pole windings 23.

In some configurations, the bulk moulding compound 24 (hereinafter also referred to as "encapsulant" or "encapsulating material") provides a mounting portion for mounting the stator 20 to a support structure. In some embodiments the mounting portion may be an annular rim 37 extending around a circumference of the stator as shown in FIGS. 1 and 3. In some configurations, the support structure can comprise, for example but without limitation, a chassis of an air-conditioning unit. In some configurations, a rubber isolator or boot 27 can be provided over the mounting portion of the encapsulating material 24. In some configurations in which the PCB 25 is generally encased by the encapsulant 24, the rubber boot or rubber isolator 27 surrounds the perimeter of the PCB 25, and the PCB 25, including components mounted on the PCB 25, the stator core 21, the core insulator structure 22 and the windings 23 are encapsulated by the bulk moulding compound to also encapsulate the PCB 25 and the components mounted to the PCB 25 within the stator assembly 20. The PCB 25 can be encapsulated at the axial location of the mounting portion of the encapsulating material 24. In some configurations, the PCB 25 and the PCB-mounted components are completely encased by the encapsulant 24.

In some configurations, the motor 10 can be clamped about the outside of the rubber boot or isolator 27 into a device assembly, such as the air-conditioning unit, to securely mount the motor 10 to a chassis 90 or other portion of the air-conditioning unit. The rubber boot or isolator 27 provides a resilient mount for the motor 10 because the rubber boot or isolator 27 is held between a clamp 91 of the chassis of the unit and the rigid encapsulant 24. In some configurations, the rubber boot or isolator 27 is retained in a clamp that is fixed to the chassis. The resilient boot 27 is resilient enough to dampen vibrations. In some configurations, the rubber boot or isolator 27 provides sufficient stiffness to provide secure mounting of the stator 20. In some configurations, the rubber material of the boot 27 has a Shore A hardness of between about 40 and about 80 with a thickness of between about 1 mm and about 5 mm.

Figure 3:
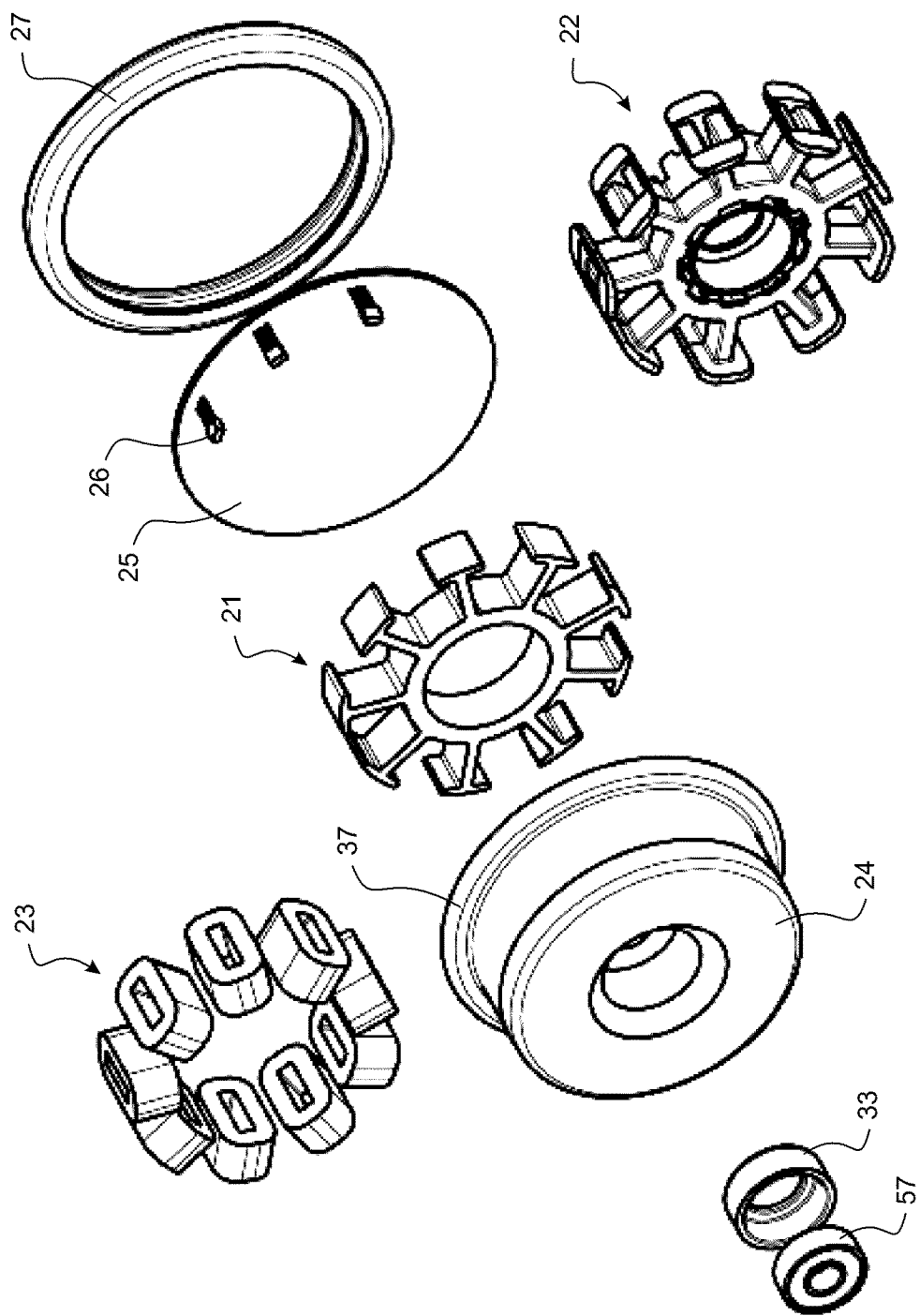
FIG. 3 is an exploded view of a stator of the motor of FIG. 1.
Figure 11:
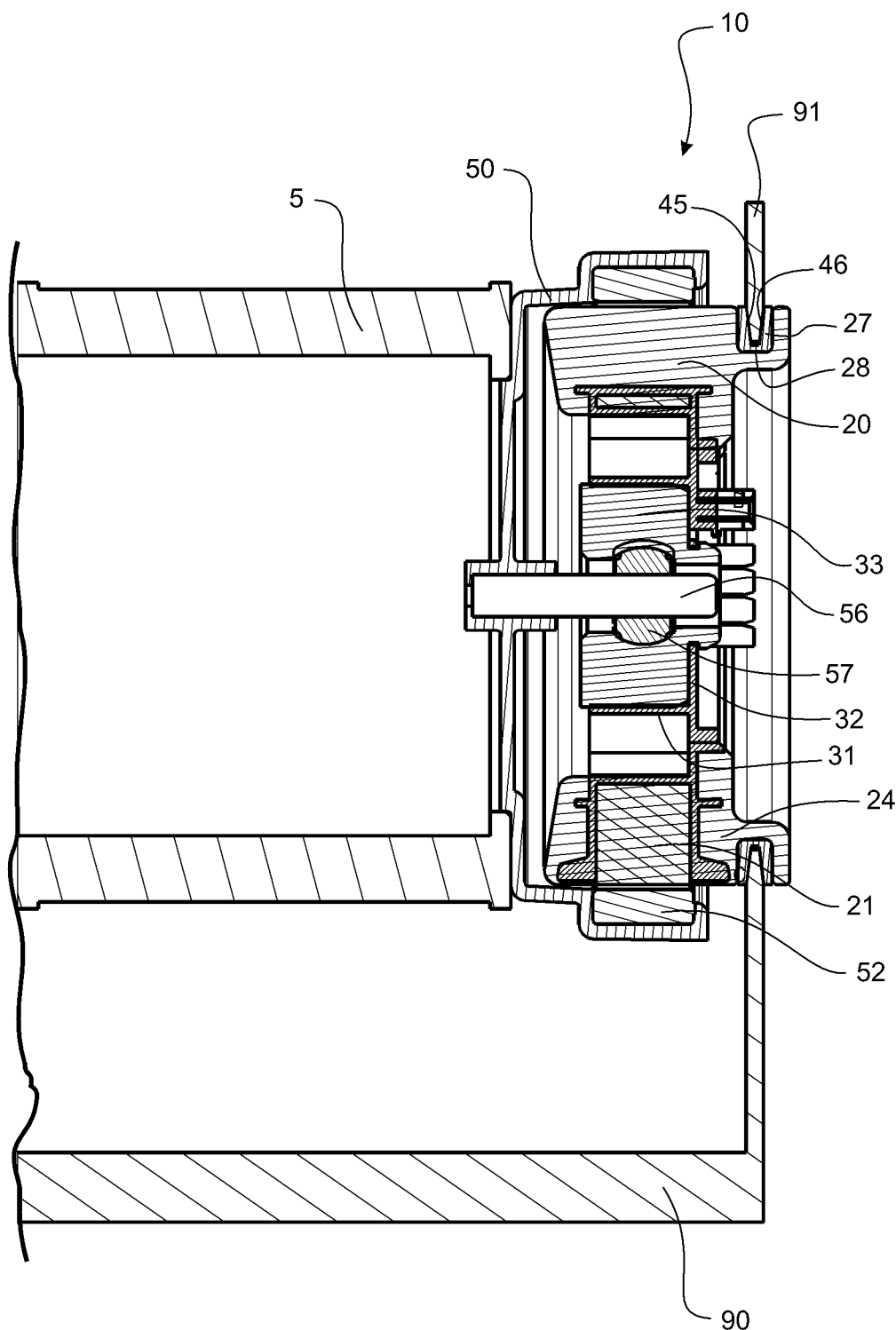
FIG. 11 is a cross-sectional view of an alternative motor and a cross flow fan (partly shown) coupled to a rotor of the motor arranged and configured in accordance with certain features, aspects and advantages of an embodiment of the present invention.

With reference to FIGS. 1 and 3, the illustrated rubber boot 27 is annular with generally U-shaped or C-shaped cross-section that defines a radially inwardly opening (or facing) recess. The resilient boot 27 can be received within a groove in the clamp that is used to radially and axially secure the stator. A perimeter of the PCB 25 may be located within the recess defined by the U-shaped or C-shaped cross-section of the boot 27. In some configurations (see FIG. 11, for example), the boot 27 may comprise a radially outwardly opening (or facing) recess defined by the U-shaped or C-shaped cross-section. A corresponding rim or protrusions in the chassis 90 and/or the clamp 91 can be provided to interface with the outwardly opening (or facing) recess of the U-shaped cross-section. The stator 20 of FIG. 11 comprises an annular groove 28 around a circumference of the stator for receiving the annular resilient member 27. The resilient member 27 provides an outwardly facing annular channel 29 (FIG. 12B), having a substantially U- or V-shaped cross-section, for receiving a clamp or holding feature of the air-conditioning unit support structure or chassis for example.

Figure 2:
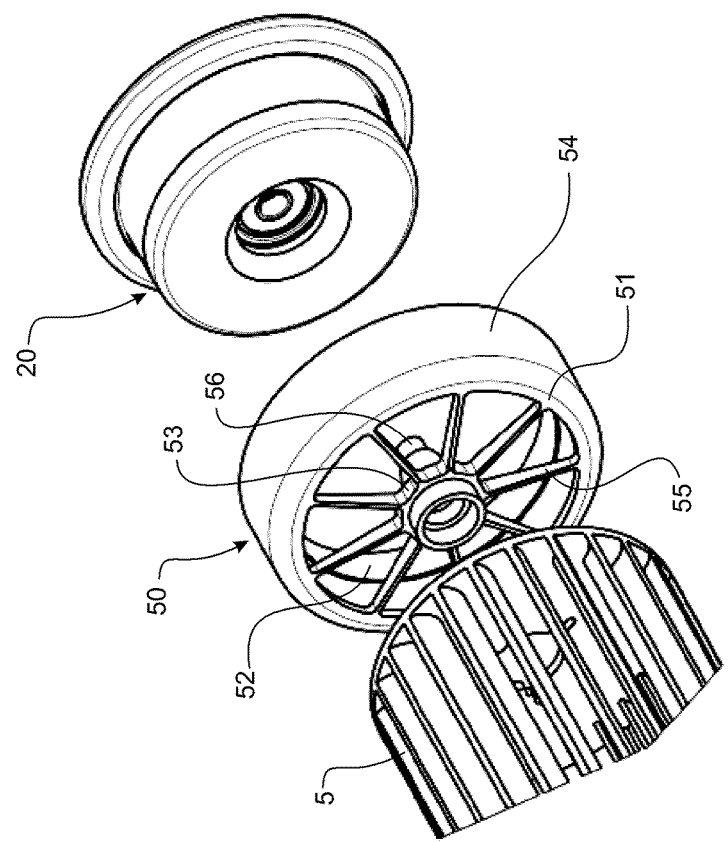
FIG. 2 is an exploded view of the motor and fan of FIG. 1.

A fan, for example fan 5 in FIGS. 1 and 2, creates a higher air pressure on the fan side of the stator. This higher air pressure could result in air transfer past the motor. In addition to the annular resilient member 27 providing a resilient mount for the stator, the member 27 also provides an air seal to prevent air passing from the fan side of the stator past the stator.

In some embodiments the annular resilient member or isolating member 27 has a plurality of projections spaced apart circumferentially around an axial facing surface. The projections may assist in dampening vibrations by providing more resiliency to the isolating member. For example, in the exemplary embodiment of FIGS. 12A and 12B the isolating member 27 comprises projections 44 formed on the inside surface of the radially outwardly facing annular channel 29 provided in the member 27. Alternatively the projections 44 may be provided on an outwardly facing surface or surfaces of the annular resilient member 27 for contacting the inner surface of a radially inwardly facing opening or recess provided, for example, in clamp 91 (see FIG. 1). The projections may be provided on first 45 and a second 46 axially separated, generally oppositely facing, annular surfaces of the annular resilient member 27 (see FIG. 11, for example).

Figure 12A:
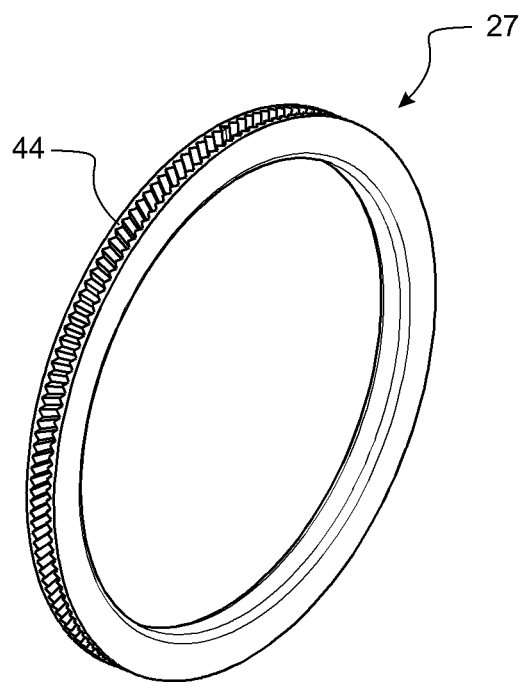
FIG. 12A is a pictorial view of an annular resilient member that is arranged and configured in accordance with certain features, aspects and advantages of an embodiment of the present invention.
Figure 12B:
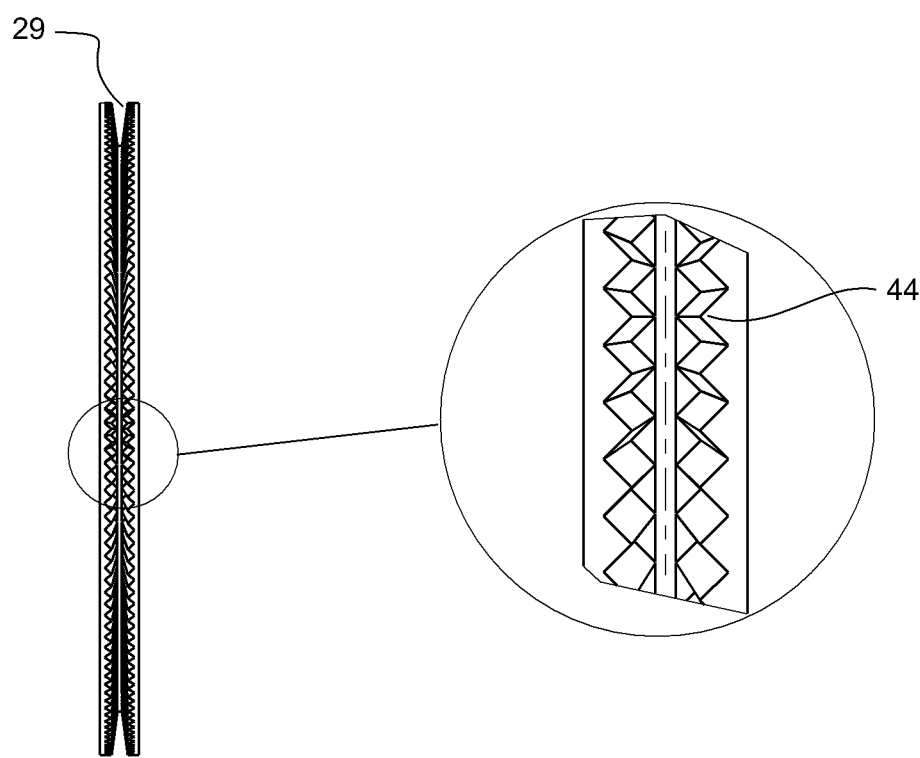
FIG. 12B is a side view and expanded side view of the annular resilient member of FIG. 12A.

In the exemplary embodiment of FIGS. 12A and 12B the projections are formed as radial ribs spaced apart circumferentially around the annular resilient member 27. As illustrated, the radial ribs may be arranged to form a sawtooth pattern extending circumferentially around the resilient member 27. In an alternative embodiment the projections may be formed as domes spaced apart circumferentially around the resilient member. In some embodiments the projections may have an angular circumferential spacing of between about 2 and 3 degrees. In some embodiments the projections may have an axial height above the nominal surface of the resilient member of about 0.5 mm to about 1.5 mm, or more preferably about 0.5 mm to about 1.0 mm, or even more preferably about 0.6 mm to about 1.0 mm, or still more preferably about 0.7 mm to about 0.9 mm.

In some embodiments the first 45 and second 46 axially separated facing annular surfaces are arranged at an angle to a transverse (or radial) plane of the stator so that when clamped by the support structure the axially separated facing surfaces position the stator both axially and radially. For example, in some embodiments the axially separated facing surfaces are angled, from a plane perpendicular to the motor axis 6, at about 5 to about 10 degrees, or more preferably at about 6 to about 10 degrees, or even more preferably at about 7 to about 9 degrees.

The rotor 50 can comprise a rotor frame 51 with permanent magnet poles 52 that are formed in a ring. The poles 52 on the rotor frame 51 can circumscribe the outside of the stator and can face the ends of the stator poles. In some configurations, the permanent magnet poles 52 comprise a single ring of magnet material. In some configurations, the permanent magnet poles 52 comprise a single ring of magnet material that is fabricated from a mouldable plastic-ferrite. In some configurations, individual magnets are arranged in a ring. In this specification and claims, the phrase "a ring of magnet material" should be interpreted to mean both a continuous ring of magnet material and separate magnet elements arranged to form a substantially circumferential ring with or without a circumferential space or gap between each magnet element.

The illustrated rotor frame 51 comprises a hub 53 at a rotational axis 6 of the motor 10. The hub 53 supports the rotor poles 52 for rotation about the axis. In the illustrated embodiment, the rotor frame 51 also comprises a circumferential side wall 54 for positioning the magnet poles 52 outside the stator 20, and at least one member 55 (for example, a disc or end wall) extending between the hub 53 and the circumferential side wall 54. In some configurations, the circumferential wall 54 is generally cylindrical.

Bearing Arrangement

With reference again to FIG. 1, the rotor 50 comprises a rotor axle 56. The rotor axle can extend or project axially from the rotor hub 53 to the inside of the annular core 21 of the stator 20. A bearing element 57, for example a rolling bearing with balls, needles, rollers or the like positioned between an inner race and an outer race, can be located within the stator 20. In some configurations, the bearing element 57 can omit one or more of the inner race and the outer race. The bearing element 57 rotationally couples the rotor 50 to the stator 20 via the rotor axle 56 about the rotational axis 6 (FIG. 1).

In some configurations, the bearing element 57 is positioned radially and axially within the stator core 21. The bearing element 57 can be positioned using a bearing locating member 30. In some configurations, the bearing locating member 30 is integrally formed with the stator core insulator 22, which is best shown in FIG. 1. The bearing locating member 30 ring can be rigidly supported by the encapsulation material 24 surrounding the components of the stator 20. An outer surface of the bearing element 57 can be received in the bearing support member 30 and an inner surface of the bearing element 57 can interface with the rotor axle 56. For example, the rotor axle 56 can be pressed into an inner race of the bearing element 57. The rotor 50 and the bearing element 57 can share the common axis 6 about which the rotor 50 is configured to rotate. In some configurations, the locating member 30 can be configured to provide axial and radial location of the bearing element. In some such configurations, the locating member 30 can be formed in a cup shape. The cup shaped locating member 30 can comprise a cylindrical side wall 31 and an axial facing lip or base 32.

In some configurations, the stator 20 comprises a compliant mount 33 that is positioned between the rotor 50 and the stator 20. The compliant mount 33 provides for some movement between the rotor 50 and the stator 20. Vibrations created by the rotor 50 during rotation, such as when driving a device, can be effectively damped or generally prevented from being transferred to the stator 20. In some configurations, vibrations generated in the motor are prevented from being transmitted to the fan, or are at least reduced or damped. In some configurations, the compliant mount 33 allows for angular misalignment between the stator and rotor axes. The compliant mount 33 may also allow for radial misalignment between the stator 20 and the rotor 50.

In some configurations, such as the configuration shown in FIGS. 1 and 2, the motor drives a cross-flow fan 5 (for example but without limitation, a Sirocco fan) of an air-conditioning unit. In some configurations, the fan 5 may be very long compared to an axial length of the motor 10. The fan 5 therefore is typically supported for rotation, for example by bearings, at each end. By spreading apart the bearings, better control of the axis can be obtained. The fan 5 and the rotor 50 can share a common rotational axis, which is defined as the axis 6 defined between a center of the motor bearing element 57 at the driven end and a bearing element 7 at the non-driven end of the fan 5. Misalignment between the stator 20 and the rotational axis 6 of the rotor 50 can be accommodated by the compliant mount 33 that is positioned between the rotor 50 and the stator 20.

The bearing element 7 at the non driven end of the fan 5 can be secured with a clamp 9 to a chassis of the device, such as an air-conditioning unit, for example but without limitation. A resilient mounting member 8 (for example but without limitation, a rubber bush) can be located between the bearing element 7 and the clamp 9 that is used to secure the bearing element 7 to the chassis. In some configurations, a shaft assembled to, or integrally formed with, the fan 5 can be supported by the bearing 7. In the illustrated configuration, the fan 5 rotates with the shaft about the axis 6.

In some configurations, the compliant mount 33 is a resilient member that provides a resilient mount between the rotor 50 and the stator 20. In the illustrated configuration, the resilient member 33 comprises an elastomeric or rubber sleeve 34 between the bearing element 57 and the stator 20. In some configurations, the resilient member 33 is an elastomeric or rubber cup comprising the sleeve 34 and an axial facing base or lip 35 that extends radially inward from the sleeve 34. In some configurations, a resilient member 33, for example but without limitation, an elastomeric or rubber sleeve or cup, can be provided between the rotor axle 56 and the bearing element 57. In this specification and claims, the term 'elastomeric' may be used to describe a natural rubber material or a synthetic rubber/polymer material.

The resilient member 33 can be formed from a rubber material, such as a natural rubber material or a synthetic rubber or polymer (e.g., a silicone). The resilient member 33 can be resilient enough to accommodate slight misalignment between the rotor 50 and the stator 20. The resilient member 33 should have sufficient stiffness to ensure that an air gap is maintained between the ends of the stator poles and the rotor poles 52. In some configurations, the rubber material has a Shore A hardness of between about 40 and about 80 and a thickness between the bearing element 57 and the stator 20 or rotor 50 of between about 1 mm and about 5 mm.

The compliant mount 33 for the bearing element 57 allows the driven device (e.g., a blower fan) to be directly coupled to the rotor frame 51. The compliant mount 33 for the bearing element 57 allows the driven device (e.g., a blower fan) to be directly coupled to the rotor frame 51 so that the fan and rotor share a common axis. Directly coupling the fan 5 to the rotor frame 51 reduces the number of components and simplifies the interface between the rotor 50 and the fan 5. Further, the compliant mount 33 allows for a compact motor design.

In some configurations, the bearing element 57 is mounted to the stator 20 to be axially located at or near to the magnetic centre-plane of the motor 10. The magnetic centre-plane of the motor 10 is a plane on the centre of the magnetic fields of the stator and rotor poles 52, the plane extending lateral to a rotational axis of the motor. By aligning the bearing 57 with the magnetic plane of the motor 10, magnetic forces generated by the stator 20 exerted on the rotor poles do not produce a moment on the bearing 57 because the rotor axle 56 and the bearing 57 are generally aligned with the axial position of the magnetic forces. Thus, such an arrangement helps maintain alignment of the rotor 50 relative to the stator 20 even when only a single bearing element 57 is used to rotationally support the rotor 50. In some configurations, the single bearing element 57 can be located on the magnetic centre-plane of the motor 10 and the associated resilient member 33 located between the bearing element 57 and the stator 20 or between the rotor axle 56 and the bearing element 57 can compliantly connect the rotor 50 and the stator 20.

In configurations including the cross flow fan 5 that is coupled to the rotor 50, the fan 5 and the rotor 50 can share the common rotational axis 6, which is defined as the axis 6 between the motor bearing element 57 at the driven end of the fan 5 and the bearing element 7 at the non-driven end of the fan 5. The effect of misalignment between the stator 20 and the rotor 50 on the air gap can be minimized because the bearing centre-plane is close to the magnetic centre-plane. In some configurations, the axial centre of the motor bearing element 57 is within a small distance of the magnetic plane of the motor. In some such configurations, the distance between the axial centre of the bearing element 57 and the magnetic plane of the motor is less than about 20% of the axial length of the stator core 21. In some such configurations, the distance between the axial centre of the bearing element 57 and the magnetic plane of the motor 10 is less than about 10% of the axial length of the stator core 21.

In some configurations, the stator 20 comprises the compliant mount 33 positioned between the bearing element 57 and the bearing locating member 30. The compliant mount 33 provides for some movement between the bearing element 57 and the stator 20 and, therefore, allows some movement between the rotor 50 and the stator 20. In some configurations, the compliant mount 33 can be provided between the rotor axle 56 and the bearing element 57. For example, in the illustrated motor configuration, the compliant mount 33 may be located between the axle 56 and the inner race of the bearing element 57. Other configurations also are possible.

In some configurations, the bearing element may comprise a spherical bearing to allow for angular misalignment between the rotor axis and the stator axis. The spherical bearing can be used as alternative to, or in addition to, the compliant mount 33 that is positioned between the rotor 50 and the stator 20. The spherical bearing is a bearing that allows angular movement between the inner race and the outer race of the bearing element.

In some configurations, the motor bearing element 57 is a single deep-groove ball bearing mounted with a centre plane that is coincident with the magnetic centre-plane of the motor 10. In some configurations, the motor bearing element 57 comprises a plurality (e.g., a pair) of bearing elements located close together or side by side. In some configurations, the motor bearing element 57 comprises a sleeve-type bearing.

Figure 7A:
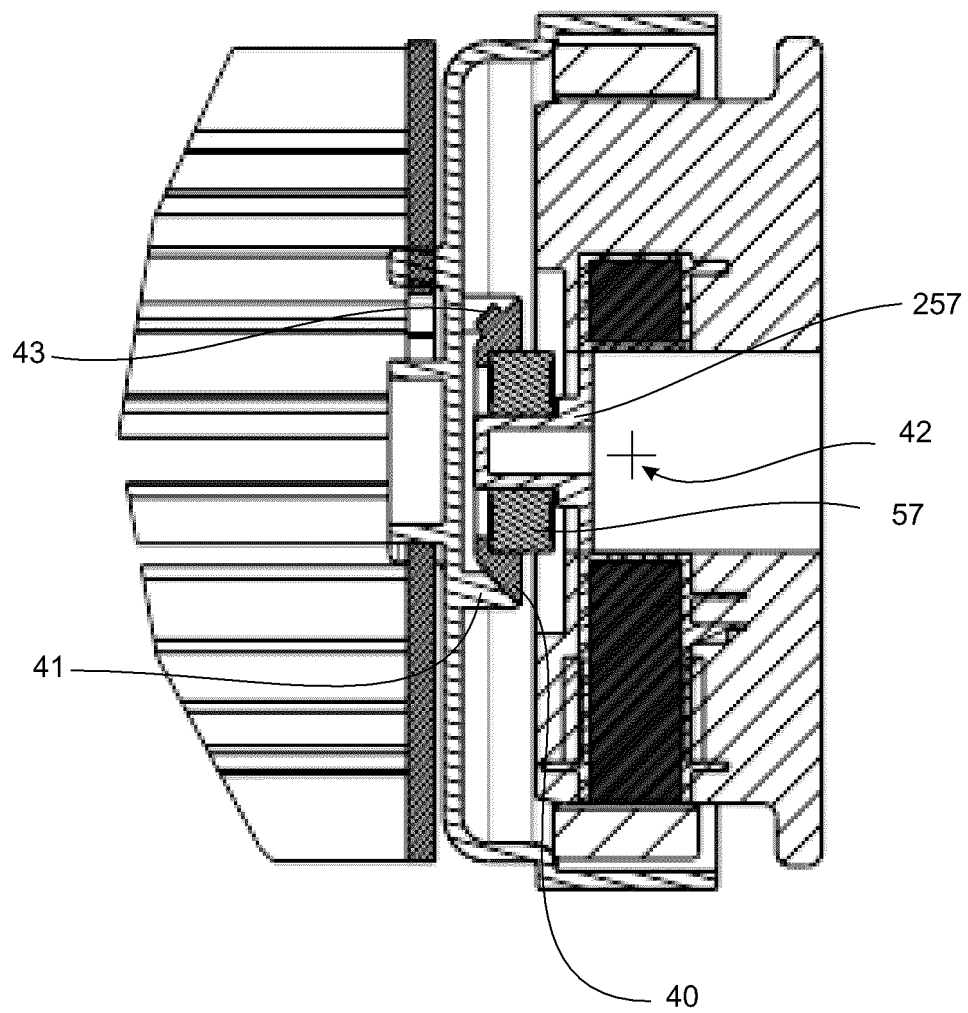
FIG. 7A is a cross-sectional view of a motor comprising a ball and socket arrangement between the rotor and stator according to one invention.
Figure 7B:
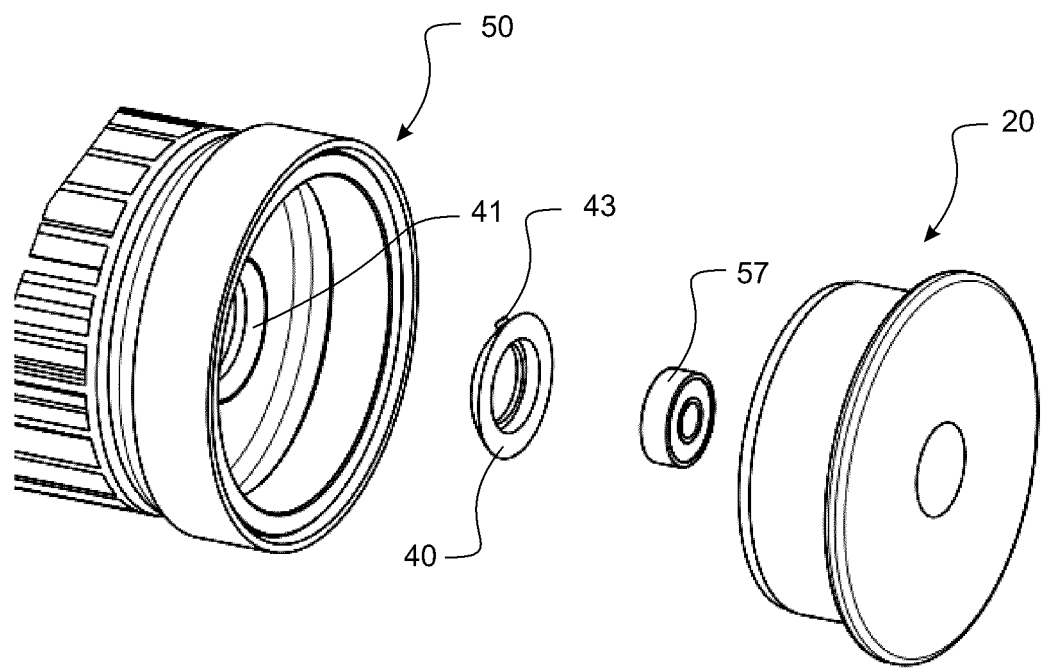
FIG. 7B is an exploded view of the motor of FIG. 7A.
Figure 7C:
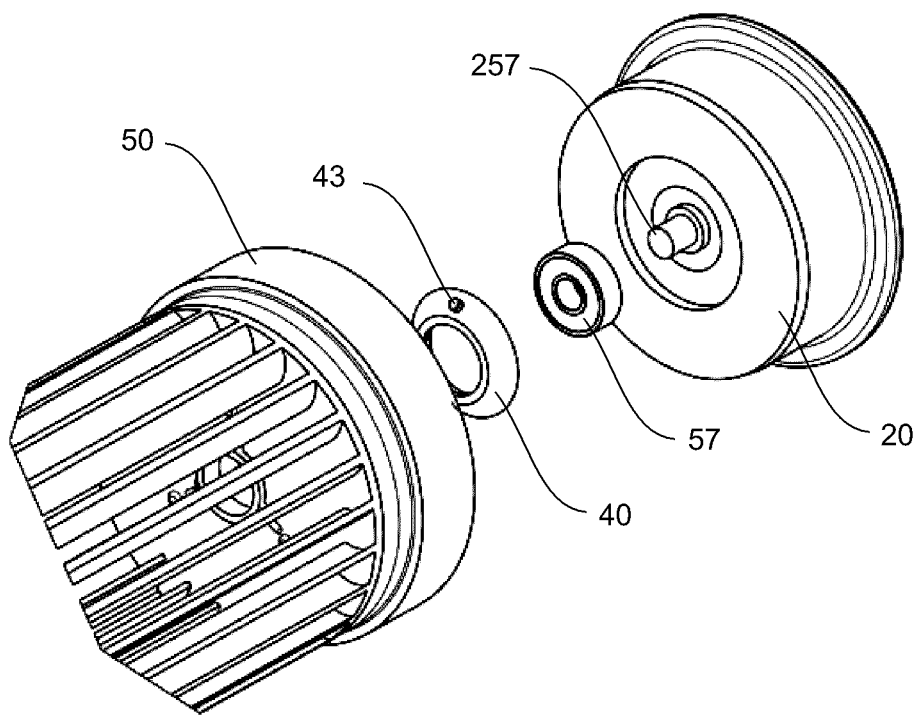
FIG. 7C is another exploded view of the motor of FIG. 7A.

In some configurations, the motor bearing element 57 is not centered on the magnetic plane of the motor 10. In some such configurations, to account for angular misalignment between the axis 6 of the rotor 50 and the stator 20, the compliant mount 33 that connects the rotor 50 to the stator 20 can comprise a spherical interface or ball joint. An example of such a configuration is illustrated in FIGS. 7A to 7C. The stator comprises an axle 257, and the bearing element 57 is positioned on the axle 257. The bearing element 57 is received in a ball component 40, and the ball 40 is received in a socket 41 mounted to, or integrally formed with, the rotor 50.

Angular movement can be accommodated by sliding contact between the ball and the socket. Contact surfaces of the ball and the socket are curved with a centre of curvature 42 that is at or near to the centre of the magnetic plane of the motor. The effect of misalignment between the stator 20 and the axis 6 of the rotor 50 on the air gap can be reduced or minimized by positioning the pivot centre 42 of the ball and socket joint near to the centre of the magnetic centre-plane of the motor. In some configurations, the pivot centre 42 is within a small distance of the magnetic plane of the motor. In some such configurations, the distance between the pivot centre 42 and the magnetic plane of the motor is less than about 20% of the axial length of the stator core 21. In some such configurations, the distance between the pivot centre 42 and the magnetic plane of the motor 10 is less than about 10% of the axial length of the stator core 21.

In some configurations, rotational slip between the ball and the socket may be controlled. In some configurations, the rotational slip between the ball and the socket may be controlled by a key and keyway arrangement. In some such configurations, the key and keyway arrangement can include, for example but without limitation, a key 43 mounted to the ball 40. The key 43 can be received in a corresponding keyway in the socket 41. In some configurations, the key 43 is a pin or a post. In some such configurations, the pin or post can have a circular cross-section extending from the curved surface of the ball with a longitudinal axis of the key 43 extending radially outward with respect to the pivot centre 42 of the socket and ball joint. In some configurations, rotational coupling between the ball and socket can be achieved by friction generated between the ball and socket or by magnetic attraction between the ball and socket.

Rotor Axle

As described above, the rotor 50 comprises the axle 56 that extends from the rotor frame 51. Because the rotor 50 is connected to the fan 5 using other members other than a drive shaft, and because the axle 56 does not function as a drive shaft, the axle 56 can be formed in manners unique to the illustrated configuration. For example, because the axle 56 does not function as a drive shaft, the axle 56 does not transmit torque loads. Rather, the rotor axle 56 simply forms an axle about which the rotor 50 can rotate. With no significant torque loading on the axle 56, the axle can be formed of a light weight construction. Moreover, because the axle 56 does not transmit torques, the axle 56 can be mounted in a simplified manner, which will be discussed below.

The axle 56 can be received in the bearing element 57 that is coupled to the stator 20. The axle 56 provides radial support for the rotor 50. The axle 56 may also provide axial support. In some configurations, for example, axial support can be provided by an axially facing shoulder 58 on the axle 56. Such a configuration is shown in FIG. 1. In the illustrated configuration, the shoulder 58 butts against an axial face of the bearing element 57.

In some configurations, the stub axle 56 is coupled to the rotor frame 51 via an axial member 59. In some such configurations, the axial member 59 comprises an outer diameter that decreases from the rotor frame 51 to the stub axle 56. In some configurations, the axial member is frusto-conical in shape. Other shapes are possible. The increasing diameter of the axial member 59 from the axle 56 to the rotor frame 51 provides sufficient rigidity in the connection of the axle 56 to the rotor frame 51 while allowing for what is a smaller diameter axle 56 than would otherwise be possible. Thus, the use of the axial member 59 facilitates use of a smaller diameter motor bearing element 57 at the stator 20, which helps to provide a compact motor size.

In some configurations, at least a portion of the rotor frame 51 is moulded from plastic. In some such configurations, at least the following portions of the rotor frame 51 are formed of a plastic material: the hub 53, the side wall 54 and the at least one member 55 connecting between the hub 53 and the side wall 54. In some such configurations, at least these components are integrally moulded from plastic material. In some configurations, the rotor axle 56 is integrally moulded with the rotor frame 51. In some configurations, the combined rotor frame 51 and rotor axle 56 can be moulded from glass filled polypropylene, PBT (Polybutylene Teraphthalate) or any other suitable engineering plastic material. In some configurations, the axle 56 is fabricated separately from the rotor frame 51 and is assembled to the rotor frame 51 in any suitable manner. For example but without limitation, the rotor frame 51 may be over-moulded to the shaft 56 or assembled to the shaft 56 using fasteners or any other suitable means, including but not limited to a splined interface, for example. The separate axle 56 may be formed from a material different from the material of the rotor frame 51, for example, steel, ceramic or any suitable engineering plastic. In some configurations comprising an integrally formed rotor frame 51 and shaft 56, the number of components is reduced and the manufacturing/assembly processes are thus improved.

Figure 8:
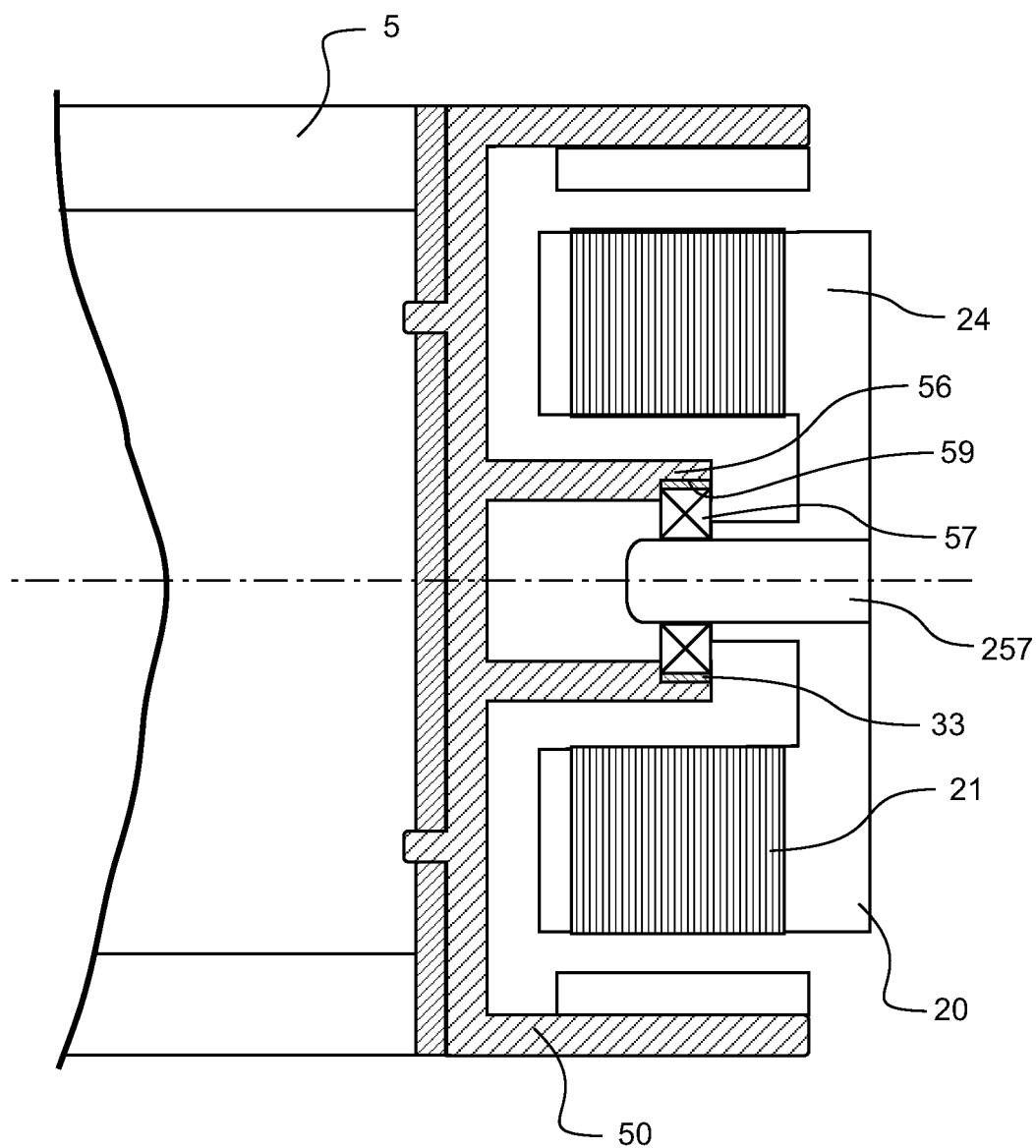
FIG. 8 is a cross-sectional view of a motor that is arranged and configured in accordance with certain features, aspects and advantages of the present invention and that comprises a rotor axle having a hollow or recess for receiving a bearing element.

In some configurations, the rotor axle 56 is received in the bearing element 57 as illustrated in FIG. 1. In some configurations, such as the configuration illustrated in FIG. 8, the rotor axle 56 can be hollow or can provide at least a recess 59 that receives the bearing element 57. For example but without limitation, in some configurations, an outer race of the bearing element 57 can be coupled to the recess of the rotor axle 56. Thus, the bearing 57 can be fitted to an axle 257 of the stator 20. In some configurations, the stator axle 257 may be integrally formed with an insulator (not shown in FIG. 8) that is used to insulate at least a portion of the core 21 of the stator 20. In some configurations, the stator axle 257 may be supported by the encapsulant that generally encases the stator components. In some configurations, the stator axle 257 may be formed separately and assembled to the stator 20 via the insulator or any other suitable stator component. In some configurations, a resilient material may be provided between the bearing element 57 and that stator axle 257, or between the bearing element 57 and the rotor axle 56, as described earlier with reference to the embodiment of FIG. 1.

Compliant Rotor Frame or Connection

In some configurations, the rotor frame 51 provides an axially and radially stiff but rotationally compliant connection between the hub 53 and the poles of the rotor 50.

The phrases 'axially stiff and radially stiff but rotationally compliant' and 'axially stiff and radially stiff but rotationally flexible' means the rotor frame 51 does not flex when a force of magnitude M is applied axially to the rotor frame 51, and the rotor frame 51 does not flex when a force of the same magnitude M is applied radially or laterally to the rotor frame 51, yet the rotor frame 51 flexes to allow relative rotation between the hub 53 or fan 5 and the rotor poles 52 about the rotational axis 6 of the rotor 50 when a force of the same magnitude M is applied to the rotor frame 51 causing a moment about the rotational axis 6 of the rotor 50. In other words, the axially and radially stiff but rotationally compliant connection can allow the rotor frame to flex more easily rotationally compared to axially and radially. Alternatively or additionally, the phrases 'axially stiff and radially stiff but rotationally compliant' and 'axially stiff and radially stiff but rotationally flexible' mean that the rotor frame 51 does not significantly flex axially or radially under normal operating conditions, but does flex to allow relative rotation between the hub 53 or fan 5 and the rotor poles 52 about the rotational axis 6 of the rotor 50 under normal operating conditions. Further, the phrases 'rotationally flexible', 'rotationally compliant', and 'low torsional stiffness' mean the rotor frame 51 can flex to allow relative rotation between the rotor hub 53 or fan and the rotor poles 52 about the rotational axis 6 of the rotor 50 under normal operating conditions. For example, under normal operating conditions, the rotor frame can flex to allow relative rotation between the rotor poles and the rotor hub of between about 0.2 o and about 2 o without significant flexing of the rotor frame in the axial and radial directions. Because the rotor frame 51 is used to transfer torque from the rotor poles 52 to the rotor hub 53, for example, the rotor frame 51 can be sufficiently stiff to transfer the torque while remaining flexible enough to absorb vibrations or variations in rotational force encountered during operation. For example, in some configurations, the connections between the rotor poles 52 and the rotor hub 53 are sufficiently stiff to transmit forces between about 0.1 Nm and about 0.5 Nm during steady state torque conditions at full operating speeds. In other words, under steady state conditions at full operating speeds, the connections between the rotor poles 52 and the rotor hub 53 preferably are not fully flexed. For example, in some configurations, the connections between the rotor poles 52 and the rotor hub 53 are sufficiently stiff to transmit forces between about 0.1 Nm and about 0.5 Nm during steady state torque conditions at full operating speeds and can allow relative rotation between the rotor poles and the rotor hub of between about 0.2 o and about 2 o without significant flexing of the rotor frame in the axial and radial directions.

In some configurations, the axially and radially stiff but rotationally compliant connection is provided by a plurality of spokes of the rotor frame 51. The spokes can be positioned between the hub 53 of the rotor frame 51 and the rotor poles 52 can be supported by the rotor frame 51. For example, in the embodiment illustrated in FIGS. 1 to 3, the rotor frame 51 comprises connecting members 55 (e.g., spokes) extending from the rotor hub 53 to the circumferential side wall 54. In some configurations, each spoke 55 has an axial depth greater than its circumferential thickness and a radial length many times the axial depth. In such configurations, due to the geometry of each spoke 55 and the number of spokes 55, the spokes 55 provide a connection between the rotor poles 52 and the rotor hub 53 that is radially and axially stiff while remaining generally rotationally compliant. An axial depth of each spoke 55 and the number of spokes 55 are such that the spokes 55 do not significantly deform axially or significantly buckle radially under normal operating conditions so that the rotor frame 51 is radially and axially stiff under normal operating conditions. However, as a circumferential thickness of the spokes 55 is relatively thin, the spokes 55 provide a connection between the rotor poles 52 and the rotor hub 53 that is rotationally flexible or compliant under normal operating conditions. The spokes 55 provide relatively low torsional stiffness between the rotor poles 52 and the rotor hub 53. Therefore, the spokes 55 provide an axially stiff and radially stiff yet rotationally compliant connection as defined above. In some configurations, one or more of the spokes 55 can be configured with contoured configurations that facilitate tailoring of the flexibility such that certain portions of the spokes 55 can be more flexible than other portions. Accordingly, one or more of the spokes 55 can be shaped and configured to tune the response. In some configurations, one or more of the spokes 55 can be shaped and configured to reduce resonance that can be caused by pulsations or the like in rotational speeds of the motor 10 and/or the fan 5.

In some configurations, each spoke 55 generally comprises a cross-section that provides a desired level of axial (e.g., bending in an axial direction), radial (e.g., compressive and/or tensile) and rotational (e.g., bending in a circumferential direction) stiffness. For example, in some configurations, a cross-section comprising a larger axial depth compared to the circumferential (lateral) thickness may be provided for a portion of the length of the spoke 55.

Figure 9:
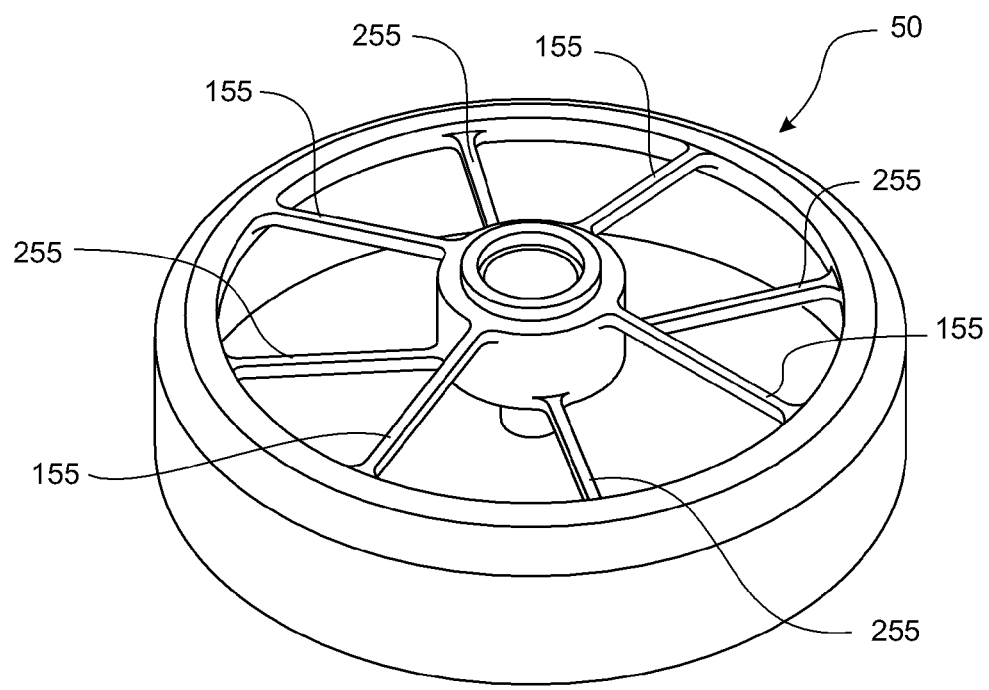
FIG. 9 is a pictorial view of a rotor that is arranged and configured in accordance with certain features, aspects and advantages of an embodiment of the present invention.

In some configurations, an axially stiff and radially stiff yet rotationally compliant connection can be provided in any suitable manner. For example, spokes 55 arranged to be axially spaced apart at the rotor hub 53 provide an axially stiff rotor frame 51 yet, depending on a cross-section of each spoke 55, the spokes 55 also can provide low rotational stiffness. Therefore, in some configurations, the spokes 55 may comprise an axial depth equal to or less than the circumferential thickness. An example of a spoke arrangement providing an axially and radially stiff yet rotationally compliant connection is illustrated in FIG. 9. As illustrated, the spokes 155 of a first set of spokes can be axially spaced from the spokes 255 of a second set of spokes. In other words, the first set of spokes 155 can intersect the rotor hub 53 at a different axial location relative to the second set of spokes 255.

In some configurations, the spokes 55 may not extend from the rotor hub 53 radially. For example, in some configurations, the spokes may extend from the rotor hub at an angle relative to the radial direction. In some configurations, the spokes may extend from the rotor hub in a curved manner relative to the radial direction such that the rotational compliance is dependent on the rotational direction of the rotor 50. For purposes of the present application, such spokes should be considered to be spokes that are described as radial spokes, as per the definition of the term 'radial' defined above, unless otherwise apparent from the context of the claims or arguments to the contrary.

The low torsional (i.e., rotational) stiffness between the rotor poles 52 and the rotor hub 53 attenuate torsional vibrations (e.g., torque ripple) and reduce or eliminate transmission of the torsional vibrations from the rotor poles 52 to the rotor hub 53. This is advantageous because torsional vibrations caused in the motor 10 can be reduced or isolated from transmission to any load coupled to the rotor hub 53. In addition, torsional vibrations that are transmitted to a load coupled to the rotor hub 53 can be attenuated or reduced compared to a rotor that is rotationally stiff such as, for example, a rotor that comprises a disc or stiff diaphragm extending between the hub and the circumferential side wall.

In the embodiment illustrated in FIGS. 1 and 2, the axial depth of each spoke 55 decreases with increasing distance from the rotor hub 53. For example, in some configurations, the axial depth of each spoke 55 at or adjacent to the rotor hub 53 is at least three times the circumferential thickness while the axial depth of each spoke 55 at or adjacent to the side wall 54 is only at least twice the circumferential thickness. In addition, in some such configurations, the radial length of each spoke 55 is at least four times the axial depth of the spoke 55 at or adjacent to the rotor hub 53.

In some configurations, each spoke 55 comprises a cross-section that comprises a depth (i.e., in an axial direction) greater than the circumferential thickness. In some such configurations, at least a portion of the radial length of the spoke 55 comprises a cross-section that comprises a depth greater than the circumferential thickness. In some configurations, the cross-section extends along the radial length of the spoke by a distance of at least four to five times the axial depth of the cross-section.

As illustrated in FIG. 1, the load (e.g., the fan 5) can be coupled to the rotor 50 at the rotor hub 53. Thus, torsional vibrations transmitted to the load (e.g., the fan 5) can be reduced or eliminated. In some configurations, the load (e.g., the fan 5) may be rigidly fixed to the rotor hub 53. In some configurations, the load (e.g., the fan) may be integrally formed with the rotor hub 53 or integrally formed with the rotor 50 at a location radially within the spokes 55. In configurations where the fan 5 and the rotor 50 are assembled together, the rotor 50 and the fan 5 can have complementary interfaces to connect the two components together. In some such configurations, the complementary interfaces can comprise, for example but without limitation, a keyed connection, a bayonet-type connection, or a splined connection. In some such configurations, the connection between the rotor 50 and the fan 5 may omit any resilient connection because resiliency or compliance is provided in the rotor frame 51, for example but without limitation.

Figure 4:
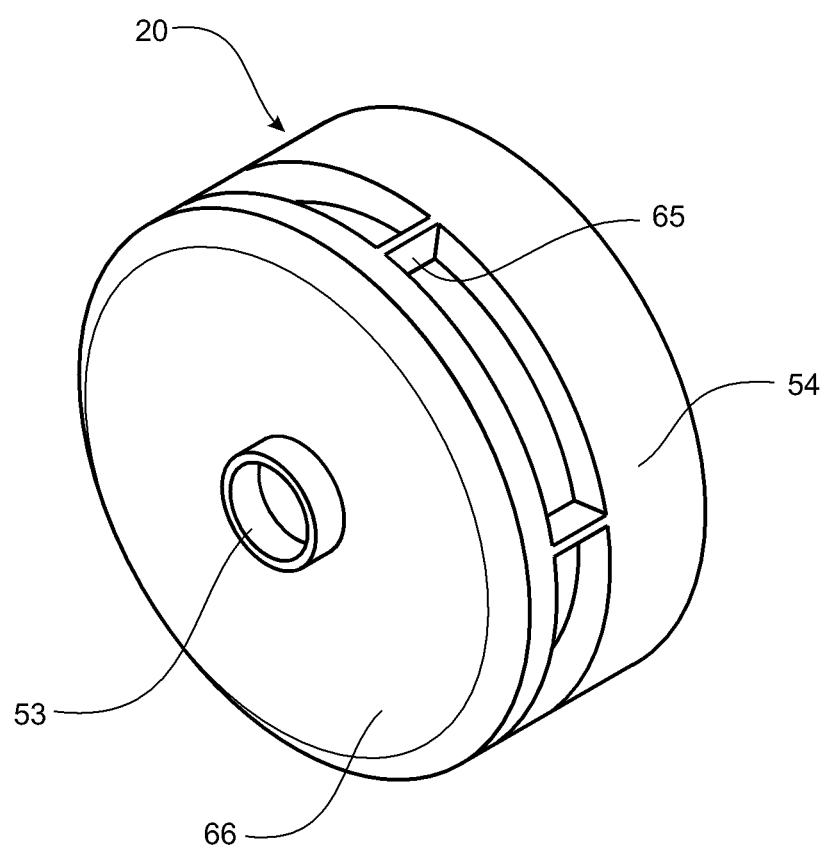
FIG. 4 is a pictorial view of an alternative rotor that is arranged and configured in accordance with certain features, aspects and advantages of an embodiment of the present invention.

In some configurations, the rotor frame 51 can comprise an axially and radially stiff yet rotationally compliant connection between the rotor hub 53 and the rotor poles that comprises spokes that extend generally axially. One such configuration is illustrated in FIG. 4. As illustrated, the axially and radially stiff yet generally rotationally compliant connection comprises a plurality of spokes 65 positioned between the rotor hub 53 and the rotor poles that are supported by side wall 54 of the rotor frame 51. In the configuration illustrated in FIG. 4, the spokes 65 extend in an axial direction. In the illustrated embodiment, the rotor frame 51 comprises a disc or circular end wall or end frame 66, a circumferential side wall 54 that supports the rotor poles 52 outside the stator poles, and the axially extending spokes 65 that extend between the disc 66 and the circumferential side wall 54. In some configurations, the end wall 66 may be cone shaped, dish shaped, or include or comprise generally rigid spokes that extend from the hub 53 to an annular ring or the circumferential side wall 54 with the axial spokes 65 extending between the annular ring or circumferential side wall 54 and the rotor poles 52.

In some configurations, each spoke 65 has a radial depth greater than a circumferential thickness and an axial length greater than the radial depth. For example, in some configurations, the radial depth of each spoke 65 can be at least twice the circumferential thickness while the axial length of each spoke 65 can be at least twice the radial depth. Due to the geometry and the number of spokes 65, the spokes 65 provide a connection that is radially and axially stiff while remaining rotationally compliant. In some configurations, the spokes 65 do not significantly buckle axially or deform laterally or in a radial direction with respect to the rotational axis of the rotor 50 under normal operating conditions. However, because a circumferential thickness of the spokes 65 is relatively thin, the spokes 65 provide a connection between the rotor poles 52 and the rotor hub 53 that is rotationally flexible or compliant under normal operating conditions. The spokes 65 provide a relatively low torsional stiffness between the side wall 54 and, therefore the magnet poles 52, and the rotor hub 53. In some configurations, such as the configuration shown in FIG. 4, the fan 5 may be integrally formed with the rotor frame 51 at any radial location from the centre of the rotor 50 to the outer perimeter of the rotor 50 because the compliant connection, which can comprise the spokes 65, extends axially from the perimeter of the end wall 66. In some configurations, such as those shown in FIGS. 2 and 4, the fan 5 can be coupled to the rotor 50 inboard of the spokes 55, 65. In other words, the spokes 55, 56 are interposed between the fan 5 and the magnet poles 52 of the rotor 50. As such, the fan 5 can be somewhat isolated from the magnet poles 52 by the spokes 55, 56.

Each spoke 65 can comprise a cross-section that provides a desired level of axial (e.g., compressive and/or tensile), radial (e.g., bending in a radial direction) and rotational (e.g., bending in a circumferential direction) stiffness. For example, in some configurations, a cross-section comprising a larger radial depth compared to the circumferential thickness may be provided for at least a portion of the full length of the spoke 65.

In some configurations, such as the configurations shown in FIGS. 1 to 4, the plurality of spokes 55, 65 comprises an odd number of spokes or a prime number of spokes. The inventors currently believe that an odd or prime number of spokes 55, 65 can help reduce or eliminate vibrational harmonics. Accordingly, the inventors currently believe that the odd or prime number of spokes 55, 65 can reduce or eliminate vibrations that transfer from the rotor poles 52 to the rotor hub 53.

In some configurations, such as the configurations shown in FIGS. 1 to 4, the plurality of spokes 55, 65 may be arranged or shaped to improve air flow and cooling of the motor. For example but without limitation, in some configurations such as those shown in FIGS. 1 to 3, each spoke 55 of the rotor 50 may have at least one surface that is tilted at an angle relative to an axial plane defined through the motor that intersects a longitudinal axis of the spoke. In some configurations, given a direction of rotation, at least a portion of a leading edge of the spoke (i.e., the surface that faces the direction of rotation) is inclined relative to an axially extending plane that intersects the spoke 55 such that at least one spoke 55 can operate as a type of fan blade. In some configurations, one or a plurality of spokes 55 are sized and configured to generate a substantially axial flow of air toward or away from the stator 20. In some configurations, all of the spokes 55 are sized and configured to generate a substantially axial flow of air.

In some configurations, such as the configuration shown in FIG. 4, one or more spoke 65 of the rotor 50 may be oriented at an angle to the radial direction of the rotor 50 such that the one or more spoke 65 can operate as a type of fan blade. For example but without limitation, in some configurations such as those shown in FIG. 4, each spoke 65 of the rotor 50 may have at least one surface that is tilted at an angle relative to an axial plane defined through the motor that intersects a longitudinal axis of the spoke. In some configurations, given a direction of rotation, at least a portion of a leading edge of at least one spoke 65 (i.e., the surface that faces the direction of rotation) is inclined relative to an axially extending plane that intersects the spoke 65 such that at least one spoke 65 can operate as a type of fan blade. In some configurations, one or a plurality of spokes 65 are sized and configured to generate a substantially radial flow of air toward or away from the stator 20. In some configurations, all of the spokes 65 are sized and configured to generate a substantially radial flow of air.

In some configurations, such as the configuration shown in FIG. 4, the end wall 66 may comprise holes or apertures to allow air flow through the end wall 66 to improve cooling of the motor 10. In some such configurations, the holes or apertures are generally aligned or overlapping with holes, apertures or openings in the end of the fan 5. In some configurations, the disc or end wall 66 may comprise ribs for strengthening the disc. In some such configurations, the ribs may also assist with directing a flow of air toward one or more component of the motor.

In some configurations, such as the configurations shown in FIGS. 1 to 4, the plurality of spokes 55, 65 may be over-moulded or co-moulded with another material different from the material used in the construction of the rotor frame 51 to achieve a desired balance between axial, radial and torsional stiffness. In some configurations, the spokes 55, 65 can comprise a material embedded into or over-moulded onto the rotor frame 51, which rotor frame 51 can be plastic, to achieve desired axial, radial and torsional stiffness. In some such configurations, one or more spoke 55, 65 may comprise an embedded metal strip, for example but without limitation.

In some configurations, such as configurations in which the rotor frame 51 comprises an axially and radially stiff yet rotationally compliant connection between the rotor hub 53 and the rotor poles 52, the rotor frame 51 can comprise a rotational stop that generally limits an extent to which the rotor poles 52 can rotate relative to the rotor hub 53 and/or fan 5. For example, in some configurations where the axially and radially stiff yet rotationally compliant connection comprises outwardly extending spokes 55, a rotational stop may comprise one or more substantially rigid member or members extending outwardly from the rotor hub 53. The one or more substantially rigid member may be generally axially aligned with and located between two adjacent spokes, for example but without limitation. The one or more substantially rigid member can limit relative rotation between the rotor poles 52 and the rotor hub 53 by contacting one or more of the two adjacent spokes 55.

Figure 10:
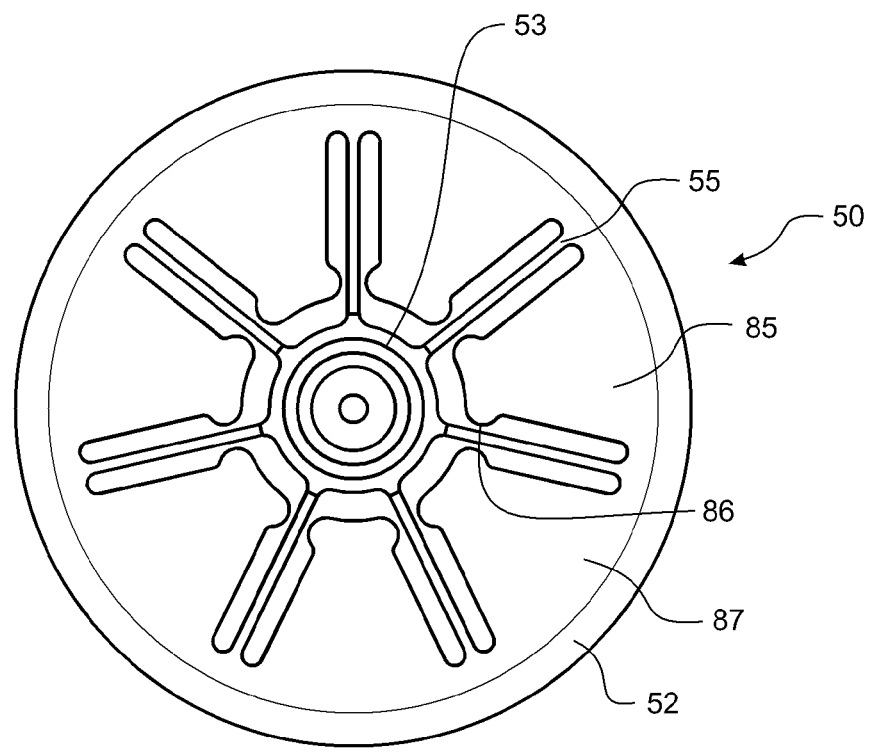
FIG. 10 is a plan view of a rotor that is arranged and configured in accordance with certain features, aspects and advantages of an embodiment of the present invention.

In some configurations, such as the arrangement illustrated in FIG. 10, the rotor frame 51 of the rotor 50 illustrated in FIG. 10 comprises stop members 85 that are located between adjacent spokes 55. In the illustrated configuration, a single stop member 85 is positioned between adjacent spokes 55. Relative rotation between the rotor hub 53 and the rotor poles 52, which are located outside the outer ends of the spokes 55, is limited by contact between the stop members 85 and at least one of the adjacent spokes 55. In some configurations, relative rotation is limited by contact between the stop members 85 and at least one of the adjacent spokes 55 at a contact area 86.

With reference still to FIG. 10, in some configurations, one or more of the members 85 extend inwardly from an outer end of the adjacent spokes 55. This arrangement allows a base 87 of the members 85 to be broader than if the stop members 85 extended from the rotor hub 53 at the inner end of the spokes 55. The broad base 87 of the stop members 85 makes the stop members 85 more rigid in the circumferential direction than the spokes 55, for example but without limitation.

One or more stop member 85 is a cantilever extending inward from the rotor frame 51. In some configurations, one or more stop member 85 is a cantilever extending inward from the rotor frame 51 from the vicinity of the outer end of the spokes 55. In some configurations, the stop members 85 can extend outwardly from the rotor hub 53. The radial position of the contact area 86 provided by the stop members 85, and the distance between the stop member 85 and the adjacent spokes 55 adjacent to the contact area 86, can be chosen to achieve a desired limit to the amount of relative rotation between the rotor poles 52 and the load (e.g., the fan 5) that is coupled to the rotor 50.

In some configurations, one or more stop member 85 may be axially spaced from the spokes 55. The one or more stop member 85 may be positioned to contact a shoulder formed on an inner side of the circumferential wall 54. In some configurations, one or more stop member 85 may be axially spaced from the spokes 55 yet be positioned to contact a shoulder formed on the rotor hub 53. In some configurations, the one or more stop member 85 can be axially spaced from the one or more spokes 55 yet be configured to contact a feature formed on an end wall of the rotor 50 (e.g., a circular or dish shaped end of the rotor 50). In some such configurations, the stop member 85 can be connected to the side wall 54 while the end wall is connected to the rotor hub 53 and vice versa. Each of these configurations enables the stop member 85 to limit the degree to which the rotor hub 53 deflects relative to magnetic poles 52 and forms means for limiting rotational displacement of the magnetic poles 52 relative to the rotor hub 53.

In some configurations, the rotor 50 and the 5 fan may comprise complementary features that limit the degree of relative rotational movement between the rotor poles 52 and the rotor hub 53 and/or the fan 5. In some such configurations, the fan 5 may comprise a member projecting axially to contact a complementary radial surface on the rotor frame 51 to limit the relative rotation between the rotor poles 52 and the fan 5. In some such configurations, the rotor 50 or the fan 5 comprises a projection that is received in an aperture or opening or recess in the other of the fan 5 or the rotor 50. An outer dimension of the aperture can be larger than a corresponding outer dimension of the projection such that the projection can move toward at least one side of the aperture a predetermined amount. The relative movement can accommodate a desired degree of relative rotation between the rotor poles 52 and the fan 5. Contact between the projection and the side of the aperture or opening or recess limits the amount of relative rotation between the rotor poles 52 and the fan 5 and/or the rotor hub 53.

Figure 5A:
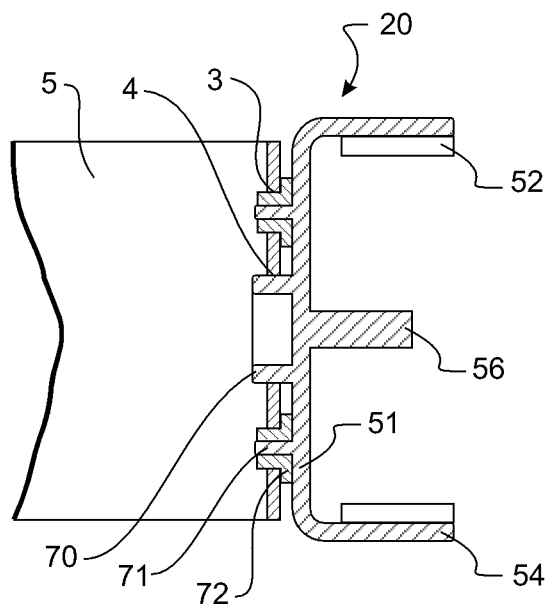
FIG. 5A is a cross-sectional view of a rotor of a motor and fan (partly shown) with a rotationally compliant connection between the rotor and the fan that is arranged and configured in accordance with certain features, aspects and advantages of an embodiment of the present invention.
Figure 5B:
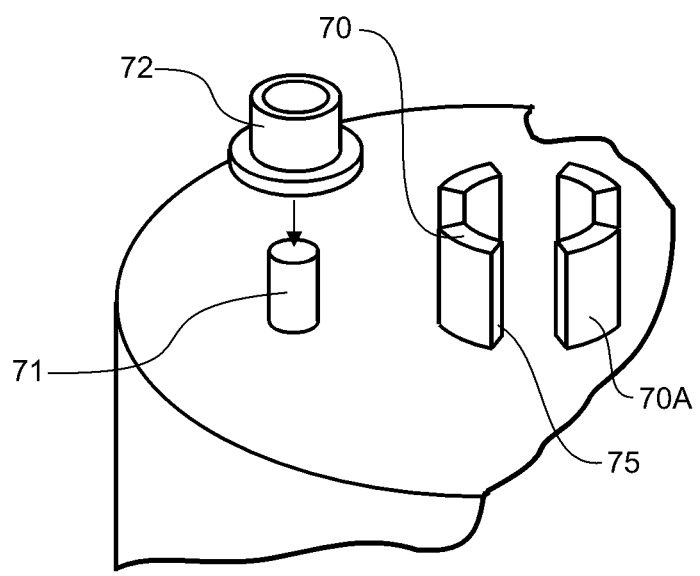
FIG. 5B is a perspective view (partly shown) of a rotor the same or similar to the rotor illustrated in FIG. 5A.
Figure 5C:
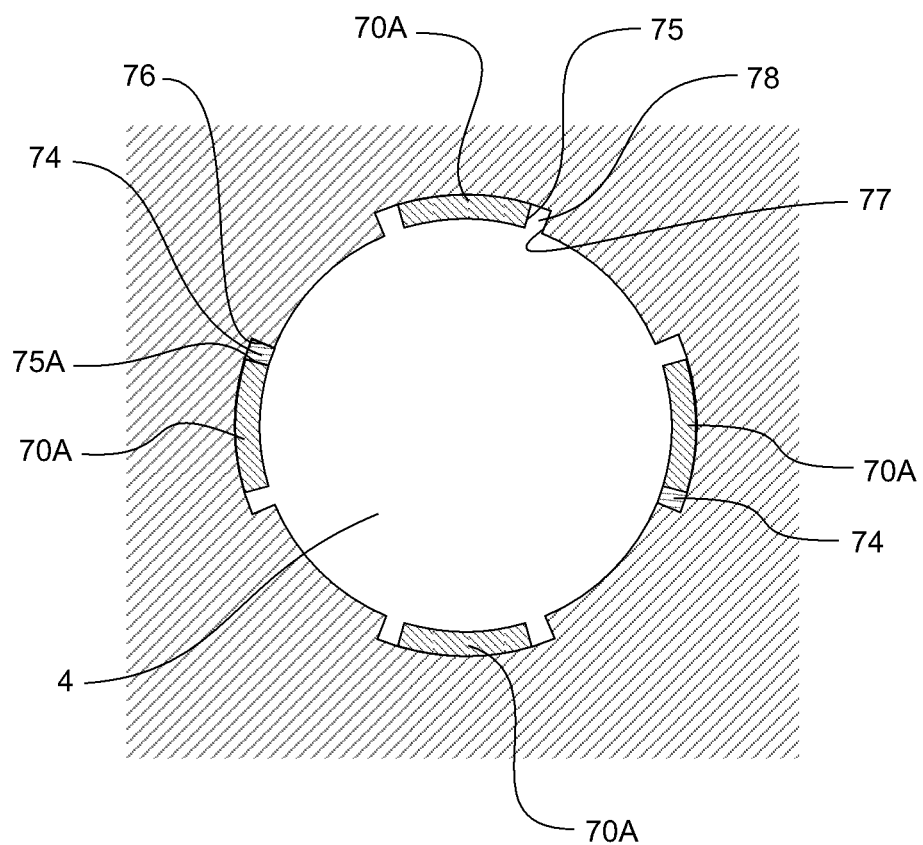
FIG. 5C is a part sectional view of a projection of the rotor illustrated in FIG. 5B engaged with a complementary recess or aperture in a load (e.g. a fan).

In some configurations, such as the configuration shown in FIGS. 5A to 5C, an axially and radially stiff yet rotationally compliant connection can be used to connect the rotor poles 52 to the load (e.g., the fan 5) that is connected to the rotor 50. In some such configurations, the rotor frame 51 comprises a projection 70. In some configurations, the projection 70 is generally cylindrical. In some configurations, the projection 70 extends from the area of the rotor hub 53 or a central portion of the rotor frame 51. In some configurations, the projection 70 is generally coaxial with the rotational axis 6 of the rotor 50. The fan 5 can comprise a complementary component, recess or aperture 4 to engage or receive the projection 70.

When the fan 5 is assembled to the rotor 50, the projection 70 can fit within the recess 4 to secure the rotor 50 to the fan 5 in a radial direction. In some configurations, the connection between the projection 70 and the recess 4 can allow relative rotation between the fan 5 and the rotor 50. In some configurations, the rotor frame 51 can comprise at least one protrusion 71 that extends from the rotor frame 51 to be received in an aperture 3 of the fan 5. In some configurations, at least one pair of the projection 70 and the recess 4 and/or the protrusion 71 and the aperture 3 can be reversed.

In some configurations, a resilient member 72 can be positioned between the fan 5 and the rotor 50. In some configurations, the resilient member 72 can connect the fan 5 to the rotor 50. In some configurations, the resilient member 72 can be fitted to the protrusion 71. When the rotor 50 is assembled to the fan 5, the resilient member 72 can be located in the aperture 3 and the protrusion 71 can be received in a bore of the resilient member 72. The protrusions 71 and corresponding apertures 3 can be spaced radially from the projection 70 so that the protrusion 71, the resilient member 72 and the aperture 3 couple the fan 5 and the rotor 50 such that the fan 5 rotates with the rotor 50 while the resiliency of the resilient member 72 provides rotational compliance between the fan 5 and the rotor 50.

In some configurations, the fan 5 may comprise a projection that can be received in a recess in the rotor frame 51. In some configurations, the projection of the fan 5 may be cylindrical while the recess has a complementary shape. In some configurations, the fan 5 may comprise a protrusion or protrusions with resilient members that can be received in complementary apertures formed in the rotor frame 51. In some configurations the rotor 50 comprises the projection or recess and the fan 5 comprises the other one of the projection or recess, and the fan 5 and the rotor 50 are coupled together by a resilient member or members spaced radially from the projection. For example, in some such configurations, a resilient member can be radially spaced from the projection and can be bonded between the rotor frame 51 and the fan 5 to resiliently couple the fan 5 and the rotor 50 together for rotation.

In some configurations, the projection 70 comprises a generally cylindrical wall that extends from the rotor frame 51 or the fan 5. In some configurations, the projection 70 comprises curved segments 70A that are circumferentially spaced apart with each segment sharing a common centre of curvature to allow relative rotation between the fan 5 and the rotor 51, as illustrated in FIG. 5B.

In some configurations, the projection can be segmented (e.g. see FIG. 5B) and the complementary recess 4 may comprise radially extending shoulders that provide stops to act on radial surfaces 75 defined by each of the segments 70A to define a limit to the amount of relative rotation between the rotor 51 and the fan 5. Any other suitable features to limit the amount of relative rotation between the rotor poles 52 and the fan can be provided to the rotor 50 and/or the fan 5. For example but without limitation, in some configurations, one or more of the protrusions 71 may have a larger size than the other protrusions 71 and the resilient member 72 may not be provided to the larger protrusion. Contact can occur between the larger protrusion 71 and the aperture that receives the larger protrusion 71 to limit the amount of rotational movement allowed by the other protrusions 71 fitted with the resilient members 72. In some configurations, one of the protrusions 71 without a resilient member may be located in an aperture of a smaller size so that contact between the protrusion 71 and the smaller sized aperture limits the amount of rotational movement allowed by the other protrusions 71, which are fitted with the resilient members 72.

In some configurations, a resilient member 74 may be provided between one or more of the circumferentially facing surfaces 75 of the segments 70A of the projection 70 and a corresponding facing surface 76 of the recess to provide rotational compliance between the fan 5 and the rotor 50. This arrangement is illustrated in FIG. 5C. In some configurations, the resilient member 74 can be provided in addition to, or as an alternative to, the protrusions and apertures 71, 3 described above. In some configurations, a circumferential space 78 between a shoulder 77 of recess 4 and a facing shoulder 75 of a segment 70A may be smaller than the circumferential space between a shoulder 76 of the recess and a shoulder 75A of the segment 70A where a resilient member 74 is located so that faces 77 and 75 can butt together to limit the amount of relative rotation between the load (e.g., the fan 5) and the rotor poles 52 for a predetermined amount of elastic deformation of the resilient member 74.

In some configurations, such as the configuration illustrated in FIGS. 5A and 5B, the resilient member 72 may comprise an axial facing shoulder to provide resiliency between the fan 5 and the rotor 50 in an axial direction. In some configurations, axial facing surfaces of the rotor frame 51 and the fan 5 can contact to render an axial connection between the fan 5 and the rotor 50 both axially and radially stiff.

In some configurations, the resilient member 72 may be assembled over the protrusion 71 or may be over-moulded onto the protrusion 71. In some configurations, there is a plurality of protrusions 71. In some configurations, there is an odd number or prime number of protrusions 71.

With reference to FIG. 5A and FIG. 5B, the illustrated protrusions 71 are posts. In some configurations, the protrusions 71 may be formed as one or more radially or laterally facing surface or shoulder that is provided to the rotor frame 51 and/or fan 5. In some such configurations, the protrusion may be formed as a radial rib, for example but without limitation.

Rotor Magnet

Figure 6:
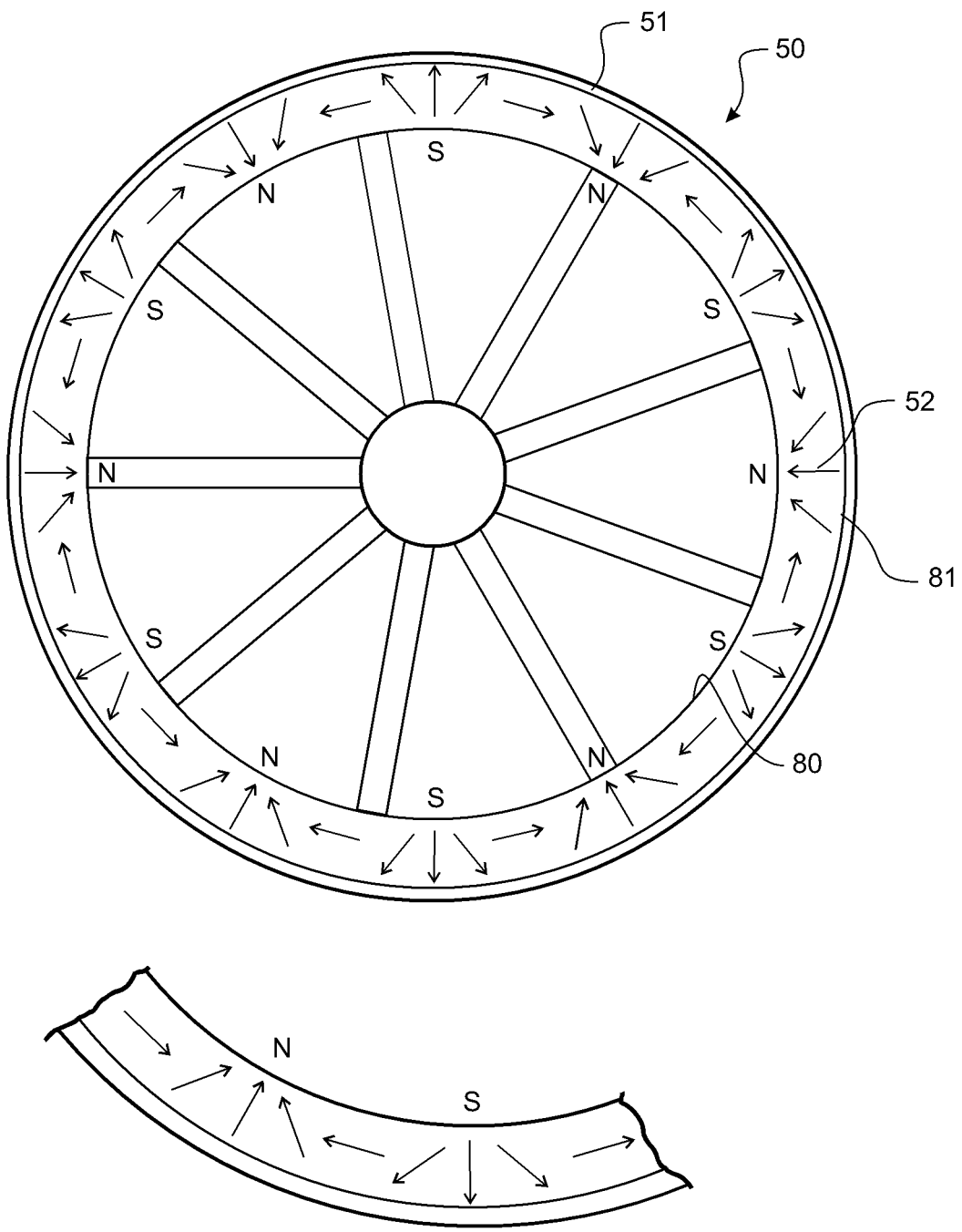
FIG. 6 is a diagrammatic plan view of a rotor that is arranged and configured in accordance with certain features, aspects and advantages of an embodiment of the present invention including an enlarged view of part of a magnetic ring material forming magnetic poles of the rotor.

With reference again to FIG. 6, the illustrated rotor 50 can comprise a ring of magnetisable material 52. The ring of magnetisable material can be connected to or suitably attached to the rotor frame 51. The rotor frame 51 can be plastic. The ring of magnetisable material can be magnetised to provide a series of inwardly facing magnet poles 52 of alternating plurality at an inside surface 80 of the ring 52.

Following magnetisation, the ring 52 has flux paths from each magnet pole to adjacent magnet poles without departing from the outside surface 81 of the ring 52. The magnetisation is such that the majority of magnetic flux between poles of the inside surface 80 of the ring 52 does not exit the ring 52 but passes from pole to pole inside the material of the ring 52 as illustrated in the enlarged view of a part of the magnetic ring 52. In some configurations, the maximum flux density on the outside diameter of the ring 52 of magnetised material is less than 50 milliTesla.

In some configurations, the ring 52 may be formed from a single body of material. In some such configurations, the body of material may be pre-formed as a ring and later assembled to the rotor frame 51. In some configurations, the rotor frame 51 may be moulded around or onto the preformed ring. In some configurations, the ring 52 may be moulded from a mouldable magnetisable material in one step and the rotor frame 51 may be moulded around or onto the preformed ring 52 in another step. In some configurations, the ring 52 may be moulded from a mouldable magnetisable material onto a plastic rotor frame 51 that was previously formed or moulded. In some configurations, the ring 52 may be co-moulded with the rotor frame 51, which can be plastic in some such configurations.

In some configurations, a mouldable magnetisable material can be a plastic loaded with magnetisable particles. In some such configurations, the magnetisable particles may be, for example, ferrite. In some such configurations, the magnetisable particles may be of the rare-earth type. In some configurations, the plastic may be a binder. In some such configurations, the plastic may be, for example but without limitation, nylon.

In some configurations, the ring of magnetisable material may be isotropic with the particles oriented randomly. In some configurations, the ring of magnetisable material may be anisotropic with the particles aligned during moulding in accordance with the intended or desired magnetisation.

In some configurations, the ring 52 may be formed in multiple components. In some such configurations, the components could be joined together to form the ring 52 prior to assembly with the rotor frame 51, or prior to over-moulding with the rotor frame 51. In some such configurations, the components could be assembled individually to the rotor frame 51 to thereby form the ring 52. In some such configurations, the component could be brought together to form the ring 52 in a mould and the rotor frame 51 can be moulded around or to the components of the ring 52 to hold them together as a ring 52.

In some configurations, the rotor 50 may not have any magnetically permeable backing member outside the magnetisable ring. In some such configurations, for example, due to the preponderance of internal flux return paths the motor 10 may achieve adequate performance without any steel backing ring positioned outside of or behind the magnet ring 52.

In some configurations, the rotor 50 may have a magnetically permeable backing member, such as a steel ring, positioned outside of or behind the magnet ring 52. The backing member may provide structural stiffness as well as a magnetic flux path.

In some configurations, the rotor 50 is for a motor 10 of a size suitable for driving the cross flow fan 5 in the HVAC air-conditioning unit. In some configurations, the rotor 50 may be between about 25 mm and about 115 mm in outside diameter. In some configurations, the magnet ring internal diameter may be between about 20 mm and about 110 mm, or between about 50 mm and about 100 mm, or about 80 mm.

In some configurations, the magnet ring thickness may be between about 4 mm and about 15 mm or between about 6 mm and about 10 mm or about 8 mm.

In some configuration, the magnet ring depth may be between about 3 mm and about 50 mm or between about 5 mm and about 25 mm or about 10 mm.

In some configurations, the magnet ring may be magnetised to have between 6 and 36 poles, or between 8 and 24 poles, or about 12 poles.

The foregoing description of the invention includes preferred forms thereof. Modifications may be made thereto without departing from the scope of the invention as defined by the accompanying claims.

What is claimed is:

1. A motor comprising:
    a stator comprising an annular core having an axis, stator poles extending radially from the annular core, and phase windings wound on the stator poles; and
    a rotor comprising:
        rotor poles facing ends of the stator poles,
        a rotor axle extending axially from the rotor to an inside of the annular core, and
        only one bearing element, the bearing element mounted inside the annular core and being positioned between the rotor axle and the stator to rotationally couple the rotor to the stator wherein allowance for misalignment between the stator axis and the rotor axle is provided by at least one of (a) the bearing element comprising a spherical bearing and (b) a compliant mount for the bearing element being positioned radially between the rotor and the stator;
    the stator further comprising:
        a bearing locating member that mounts the bearing element radially inside the annular core, and
        an insulator covering surfaces of the stator poles, the windings wound onto the stator poles over the insulator, and the bearing locating member being integrally formed with the insulator.

2. The motor as claimed in claim 1, wherein the motor comprises the compliant mount and the compliant mount is an elastomeric sleeve or rubber sleeve providing a resilient mount for the bearing element, positioned between the bearing element and the bearing locating member or between the bearing element and the rotor axle.

3. The motor as claimed in claim 1, wherein the bearing element is axially located at or near to a magnetic centre plane of the motor.

4. The motor as claimed in claim 3, wherein the distance between an axial centre of the bearing element and the magnetic centre plane of the motor is less than about 20% of the axial length of the annular core.

5. The motor as claimed in claim 1, wherein the spherical bearing is a ball joint comprising a ball component received in a socket.

6. The motor as claimed in claim 1, wherein the bearing locating member comprises a radially inward facing surface or surfaces and an axial facing surface for mounting the bearing element radially and axially.

7. The motor as claimed in claim 6, further comprising an encapsulant encapsulating the annular core, the phase windings, and the bearing locating member, the encapsulant rigidly supporting the bearing locating member.

* * * * *

UNITED STATES PATENT AND TRADEMARK OFFICE
CERTIFICATE OF CORRECTION

PATENT NO. : 9,685,840 B2
APPLICATION NO. : 14/135299
DATED : June 20, 2017
INVENTOR(S) : Germann et al.

Page 1 of 1

It is certified that error appears in the above-identified patent and that said Letters Patent is hereby corrected as shown below:

In the Specification

At Column 8, Line 13; Delete "Teraphthalate)." and insert therefore --Terephthalate).--

At Column 14, Line 28-29; Delete "Teraphthalate)." and insert therefore --Terephthalate).--

At Column 15, Line 29; Delete "0.2o" and insert therefore --0.2°--

At Column 15, Line 29; Delete "2o" and insert therefore --2°--

At Column 15, Line 48; Delete "0.2o" and insert therefore --0.2°--

At Column 15, Line 49; Delete "2o" and insert therefore --2°--

Signed and Sealed this
Twenty-eighth Day of May, 2019

Andrei Iancu
*Director of the United States Patent and Trademark Office*